T. G. PLANT.
MACHINE FOR OPERATING ON THE BOTTOMS OF BOOTS AND SHOES.
APPLICATION FILED MAY 13, 1907. RENEWED APR. 12, 1910.

958,306.

Patented May 17, 1910.
14 SHEETS—SHEET 1.

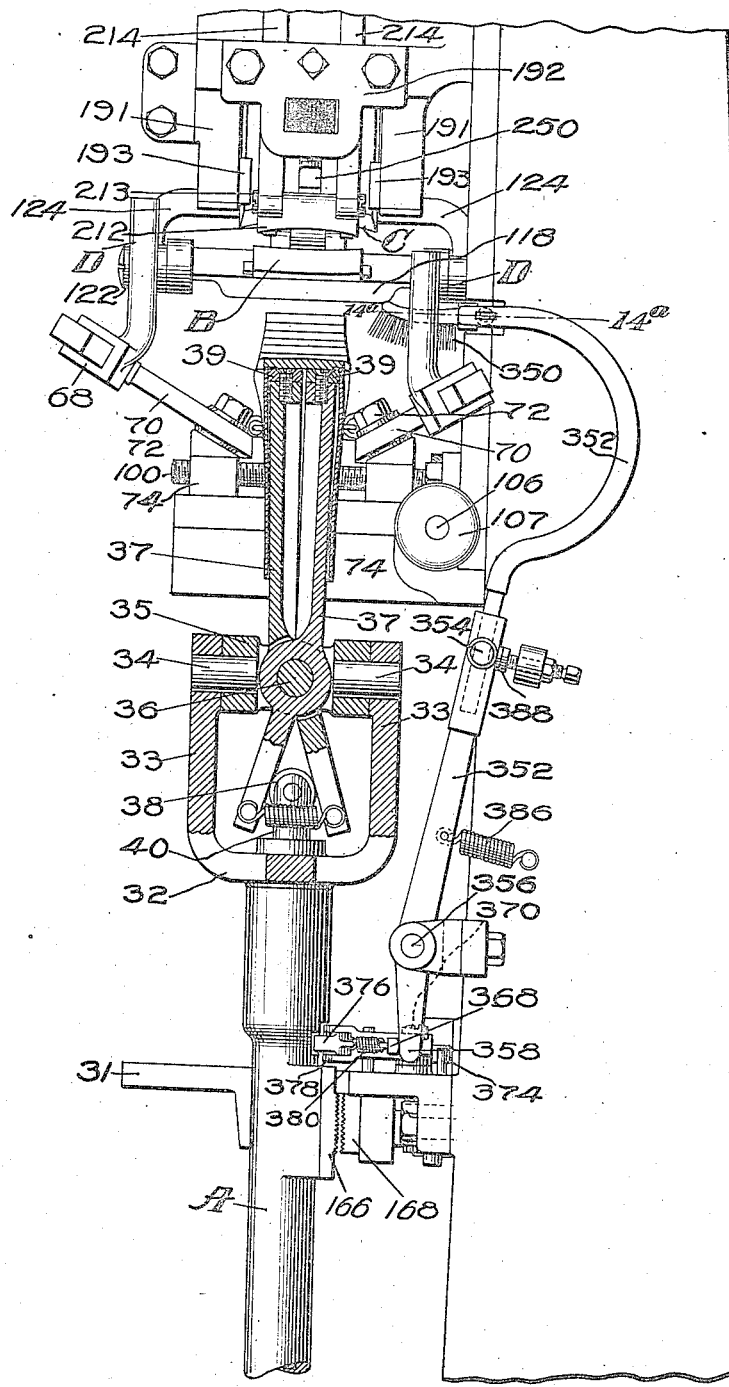

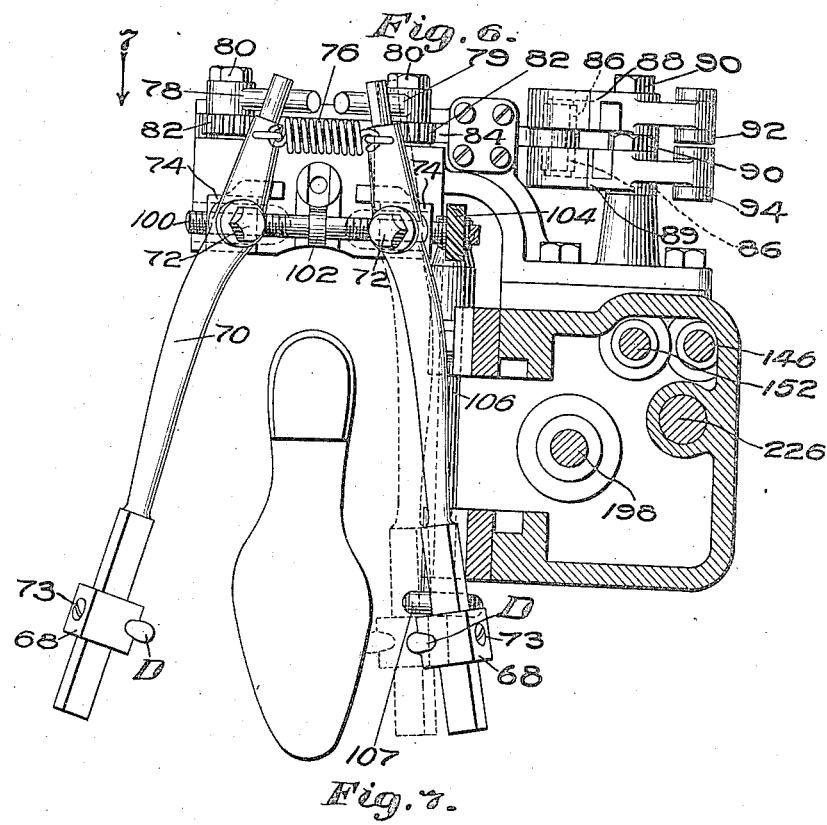
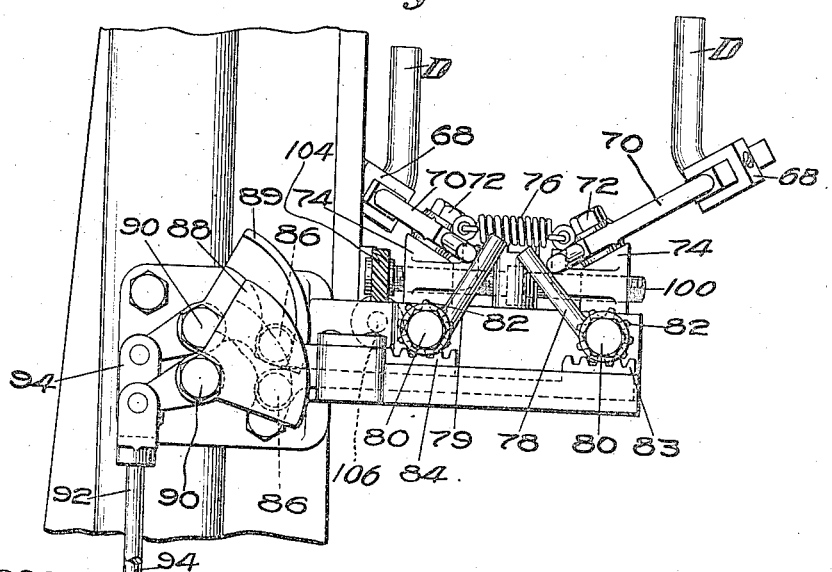

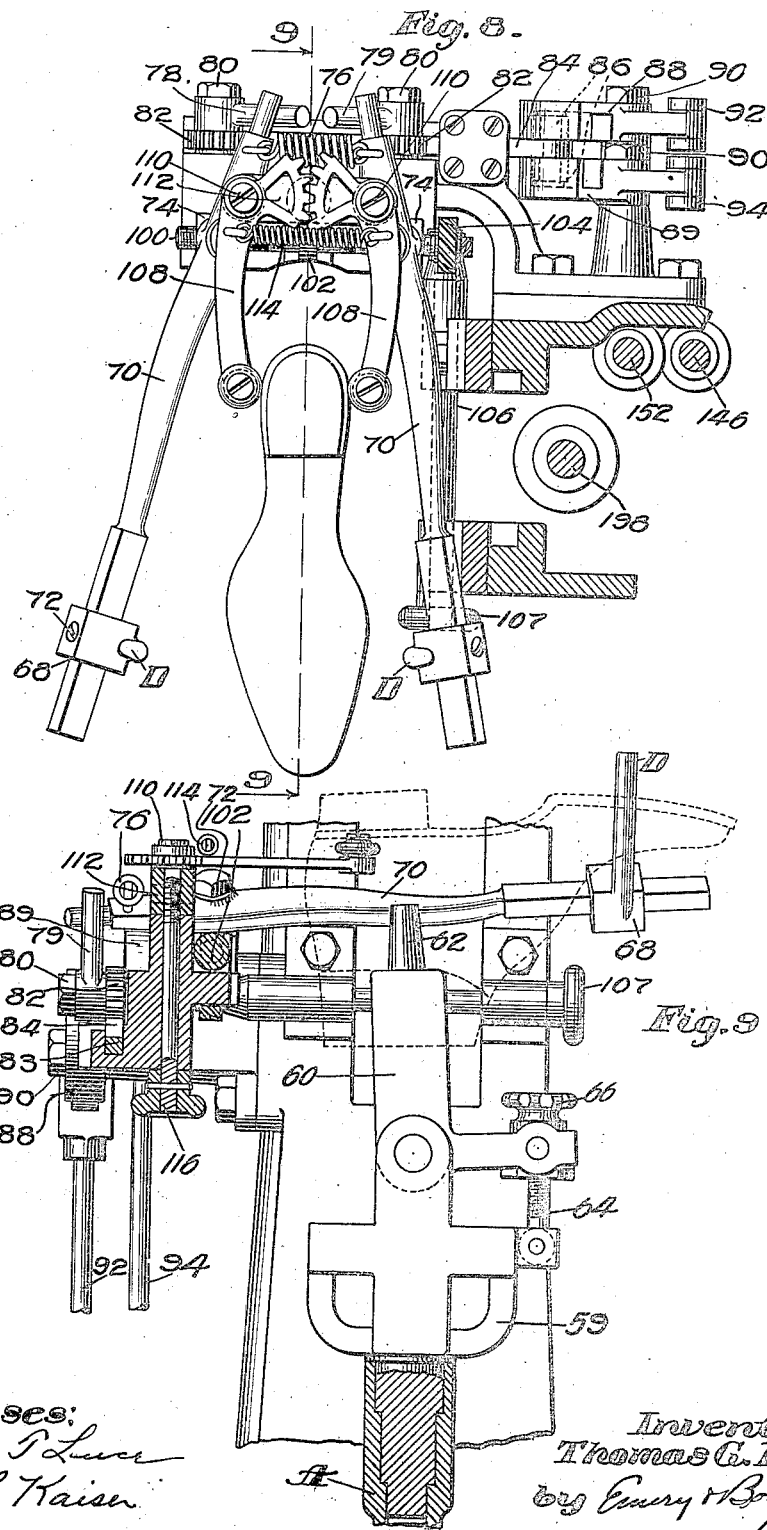

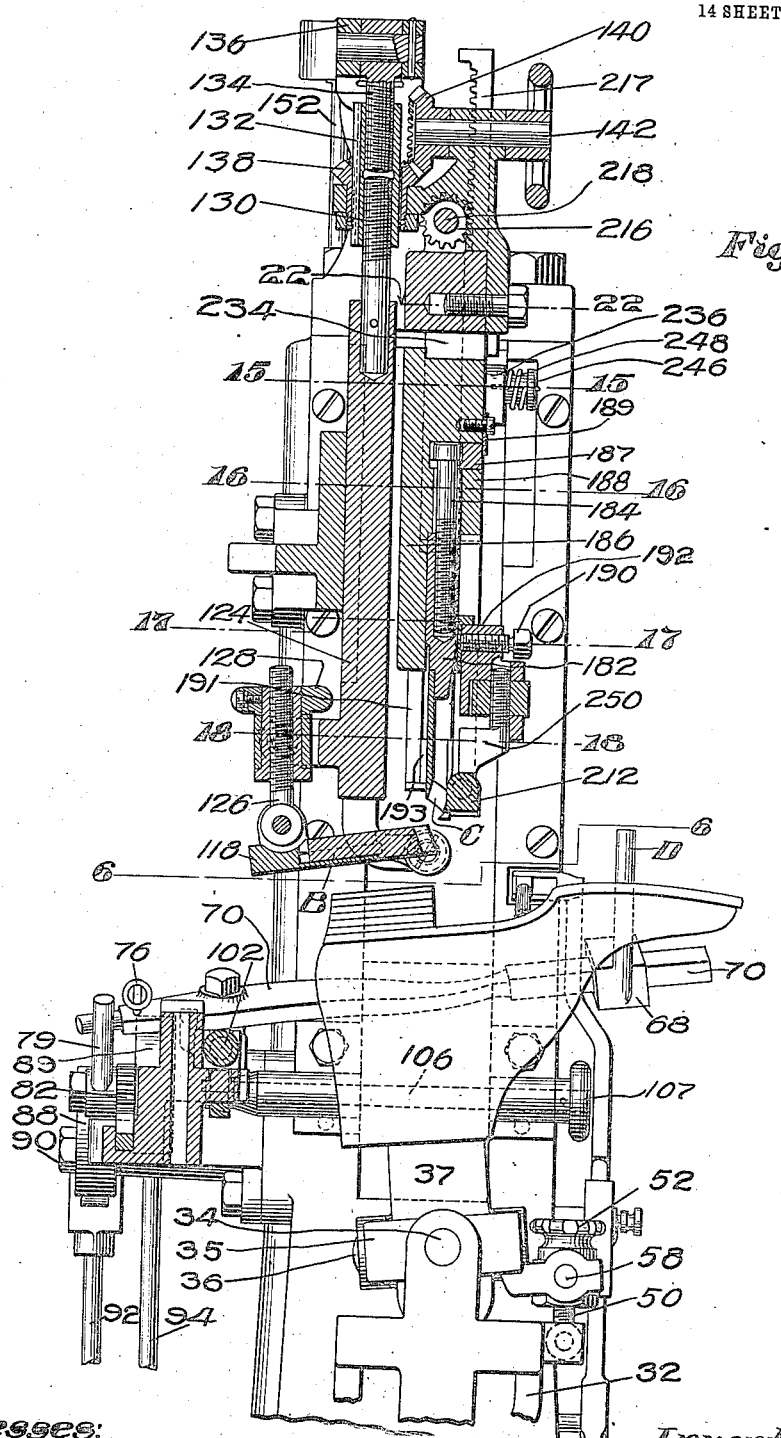

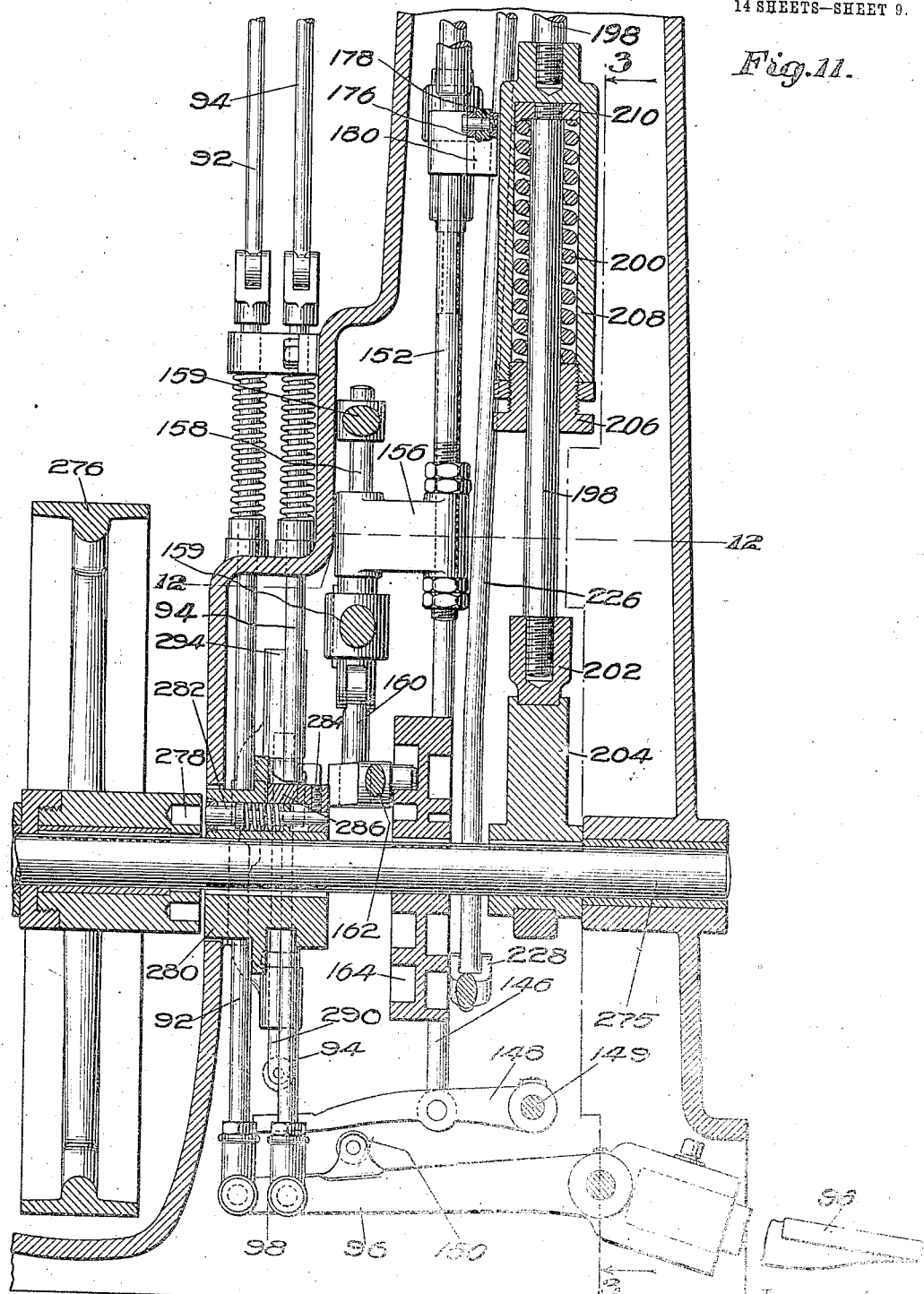

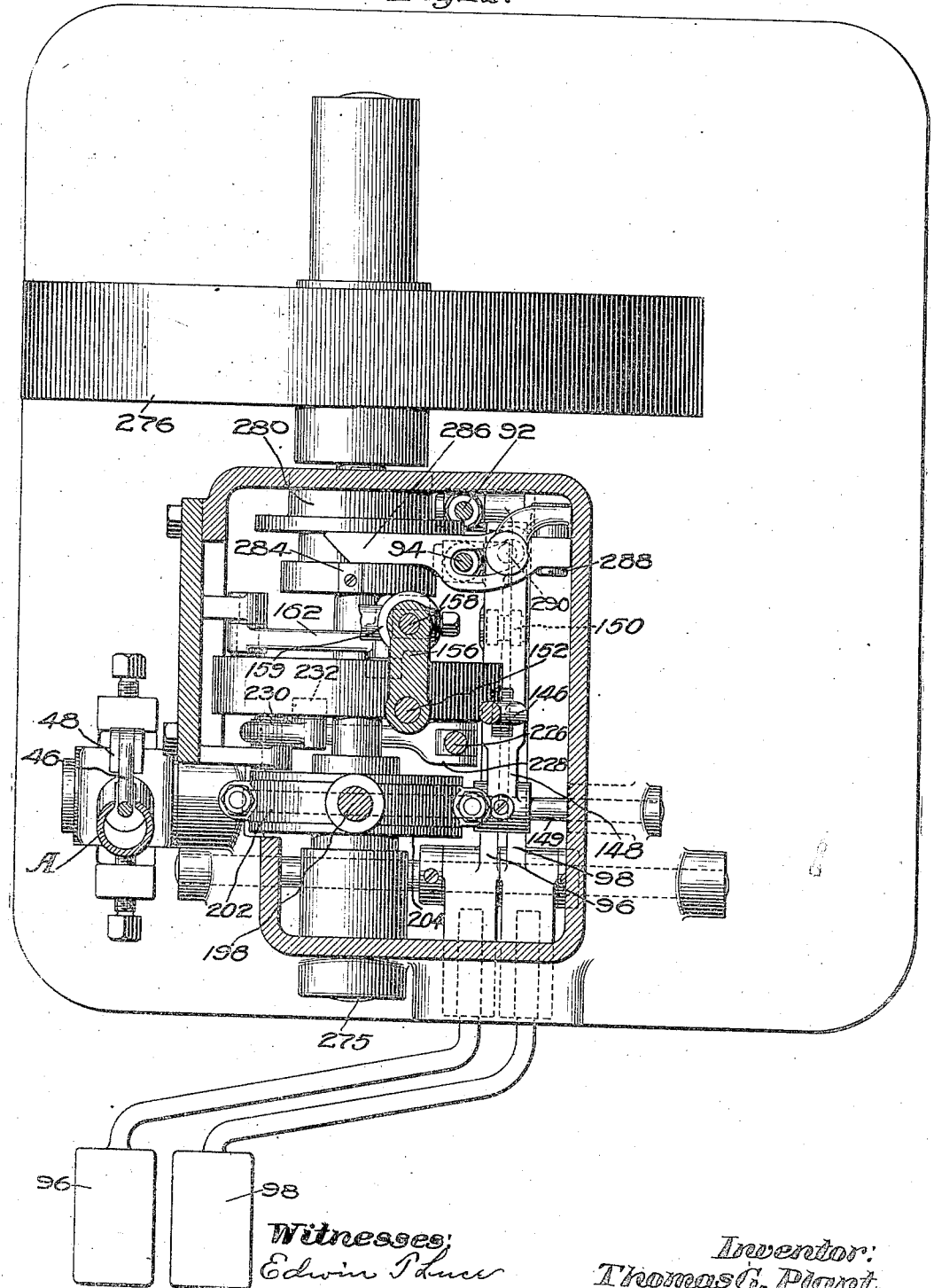

T. G. PLANT.
MACHINE FOR OPERATING ON THE BOTTOMS OF BOOTS AND SHOES.
APPLICATION FILED MAY 13, 1907. RENEWED APR. 12, 1910.
958,306.
Patented May 17, 1910.
14 SHEETS—SHEET 11.
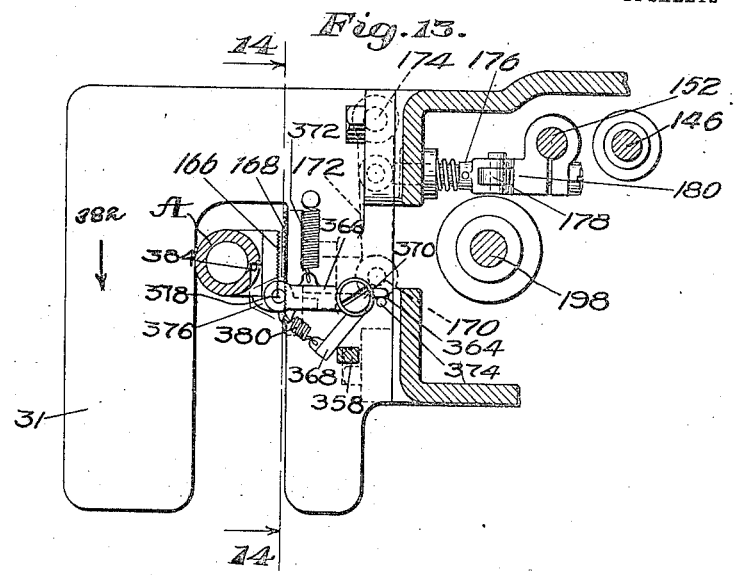
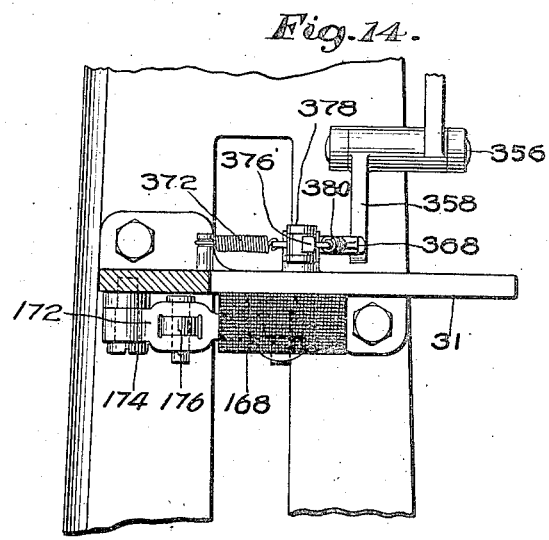
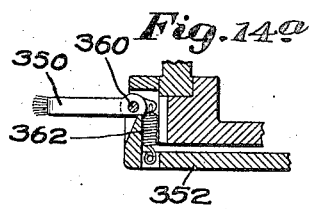
Witnesses:
Inventor:
Thomas G. Plant,
by Emery & Booth
Attys

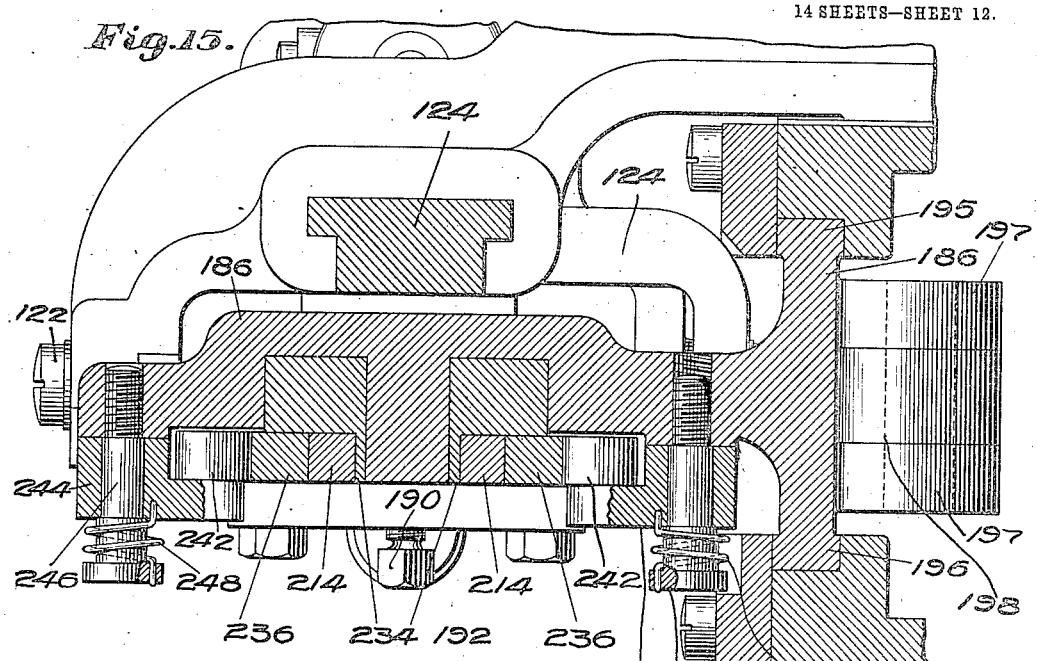
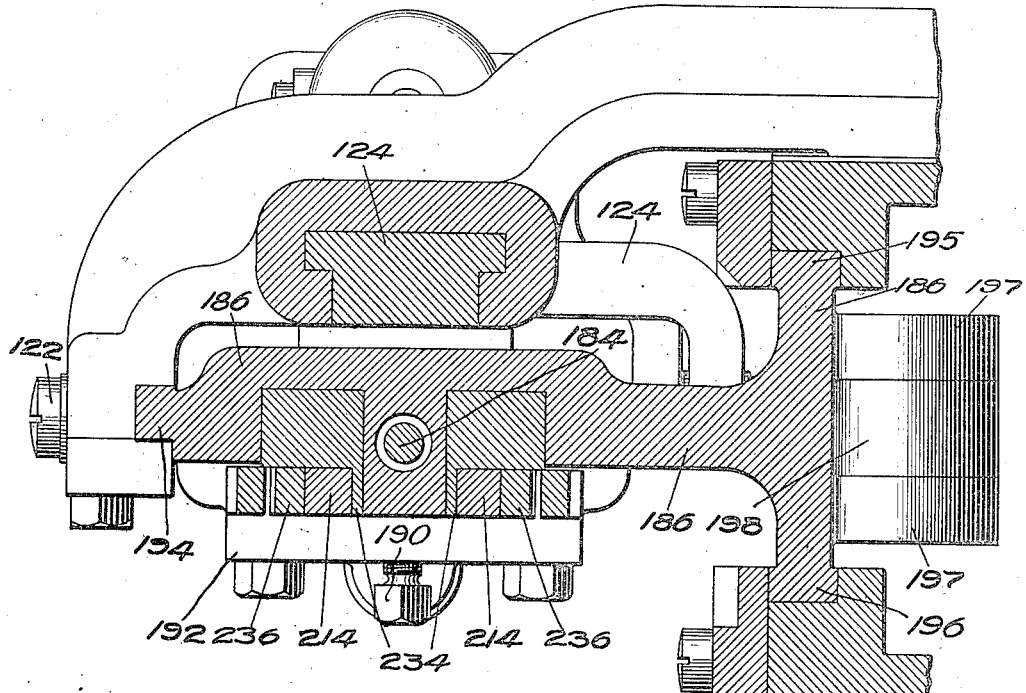

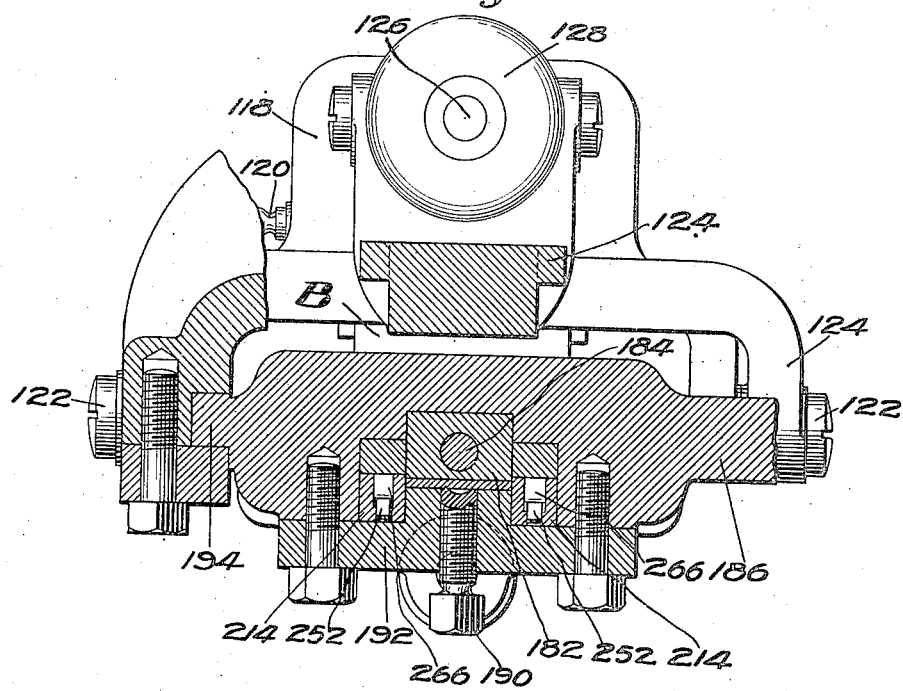
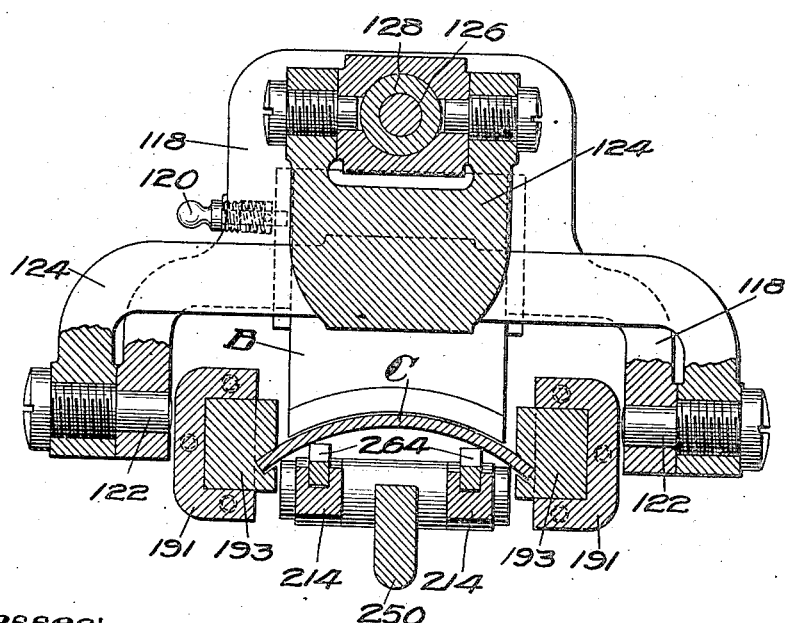

T. G. PLANT.
MACHINE FOR OPERATING ON THE BOTTOMS OF BOOTS AND SHOES.
APPLICATION FILED MAY 13, 1907. RENEWED APR. 12, 1910.
958,306.
Patented May 17, 1910.
14 SHEETS—SHEET 14.
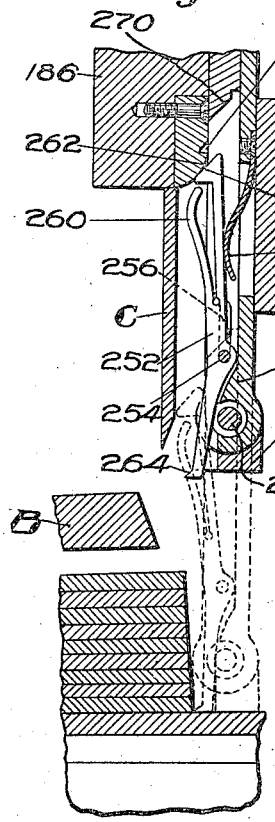
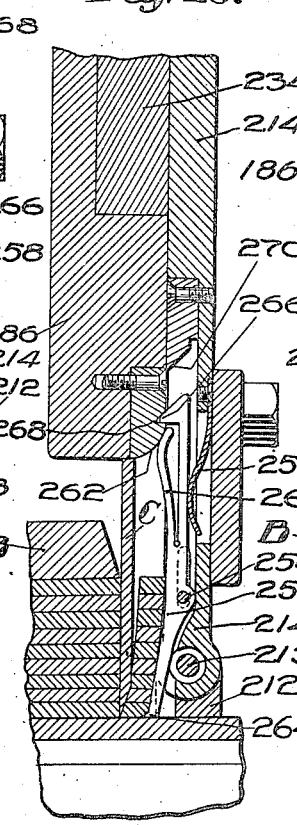
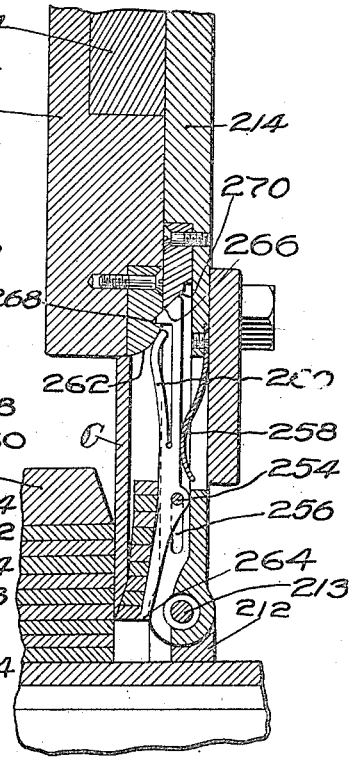
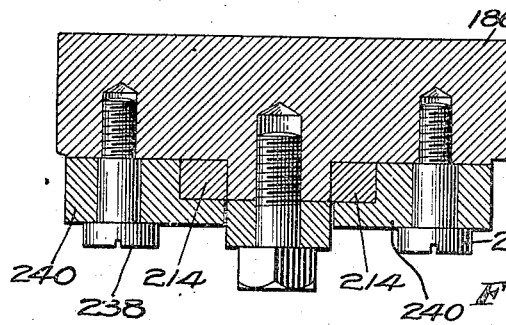
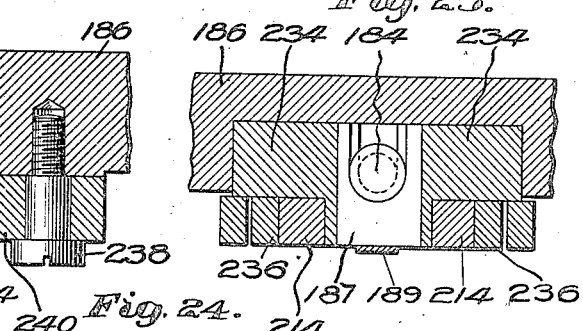
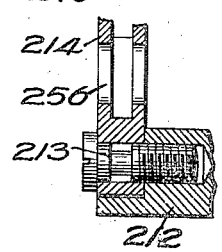

UNITED STATES PATENT OFFICE.

THOMAS G. PLANT, OF BOSTON, MASSACHUSETTS.

MACHINE FOR OPERATING ON THE BOTTOMS OF BOOTS AND SHOES.

958,306.　　　　　Specification of Letters Patent.　　Patented May 17, 1910.

Application filed May 13, 1907, Serial No. 373,276. Renewed April 12, 1910. Serial No. 554,963.

*To all whom it may concern:*

Be it known that I, THOMAS G. PLANT, a citizen of the United States, residing at Boston, in the county of Suffolk, Commonwealth of Massachusetts, have invented an Improvement in Machines for Operating on the Bottoms of Boots and Shoes, of which the following description, in connection with the accompanying drawings, is a specification, like characters on the drawings representing like parts.

This invention relates to machines for operating upon the bottoms of boots and shoes, and more particularly to machines for acting upon heels. For purposes of illustration, the invention will be described as embodied in a heel breasting machine.

The invention is designed to provide a machine of the general character above suggested which shall be of improved construction, simple, efficient and accurate in operation. One practicable manner in which these objects may be attained will more fully appear in the succeeding specification, which describes an illustrative machine embodying the various features of the invention, collectively considered.

The specific illustrative machine just referred to is shown in the accompanying drawings, in which—

Figure 1:
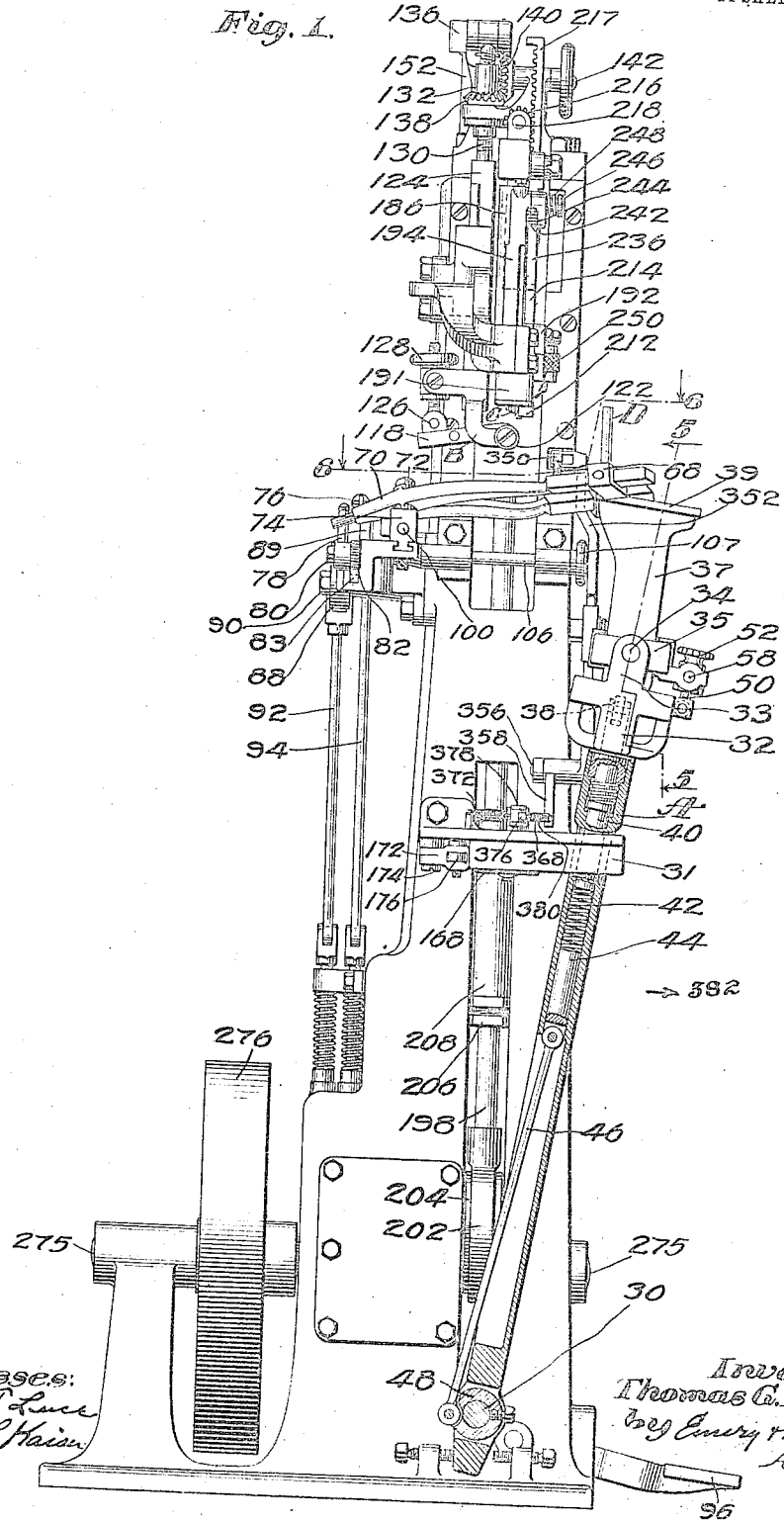
Figure 2:
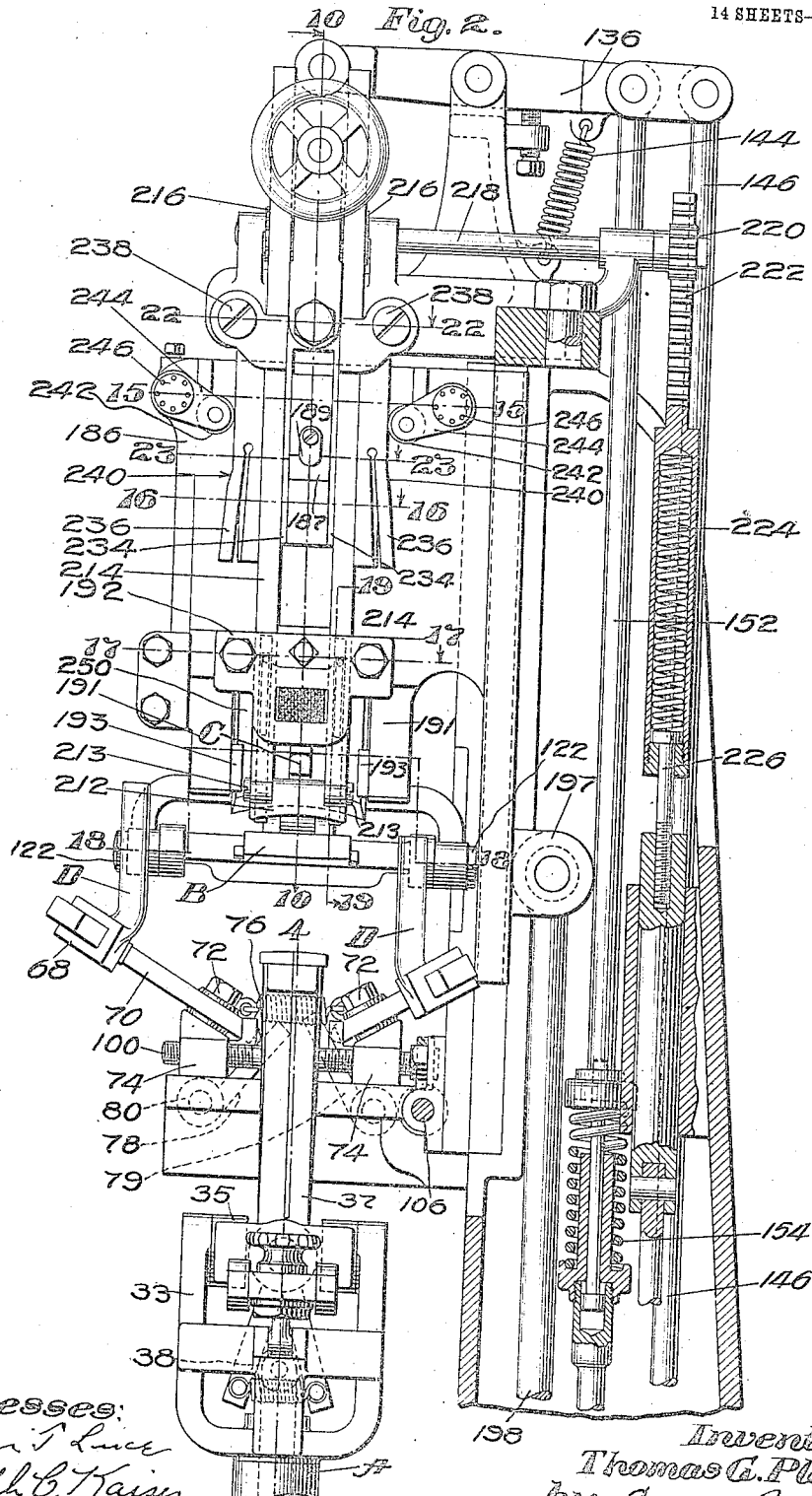
Figure 3:
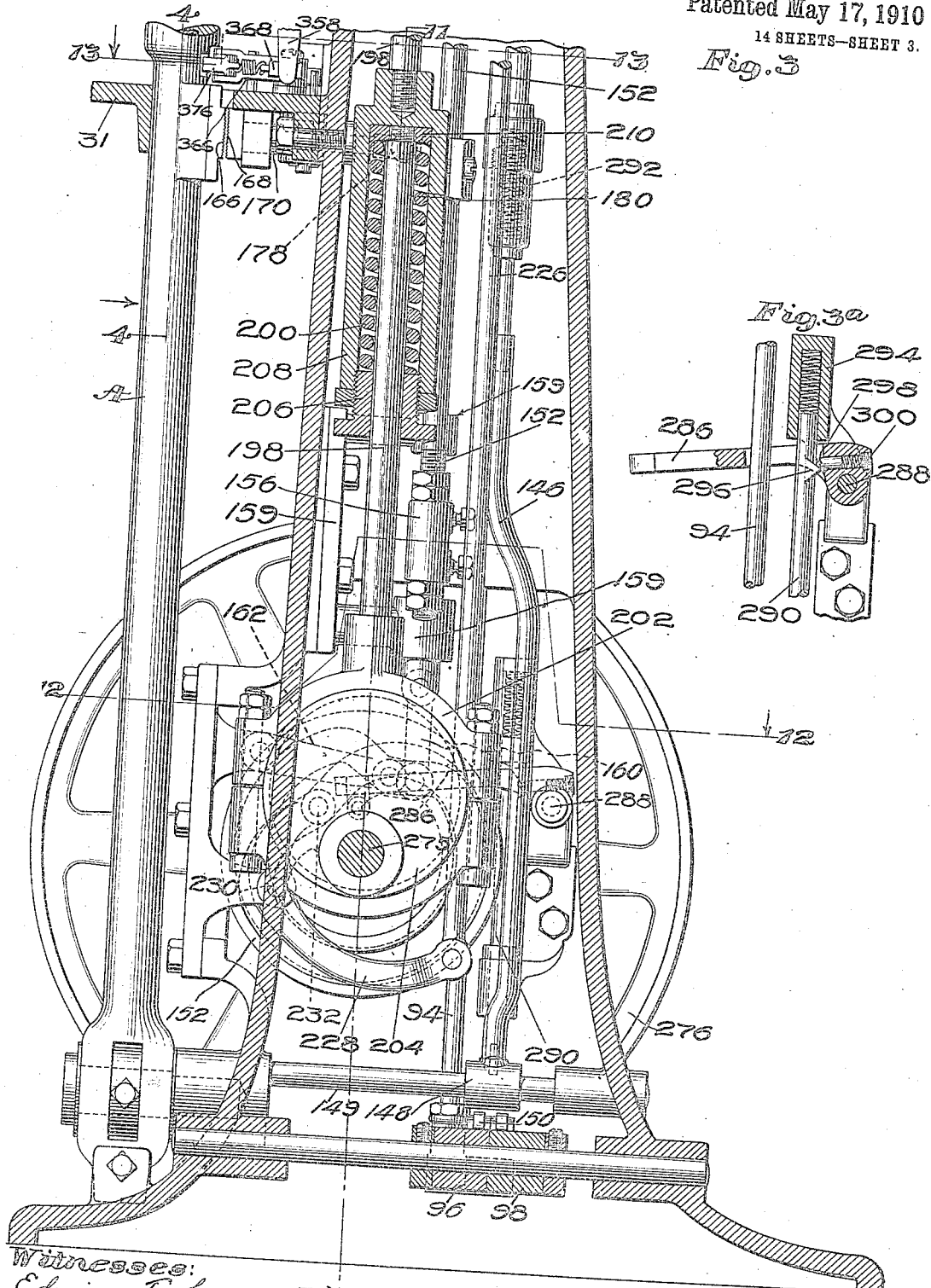
Figure 4:
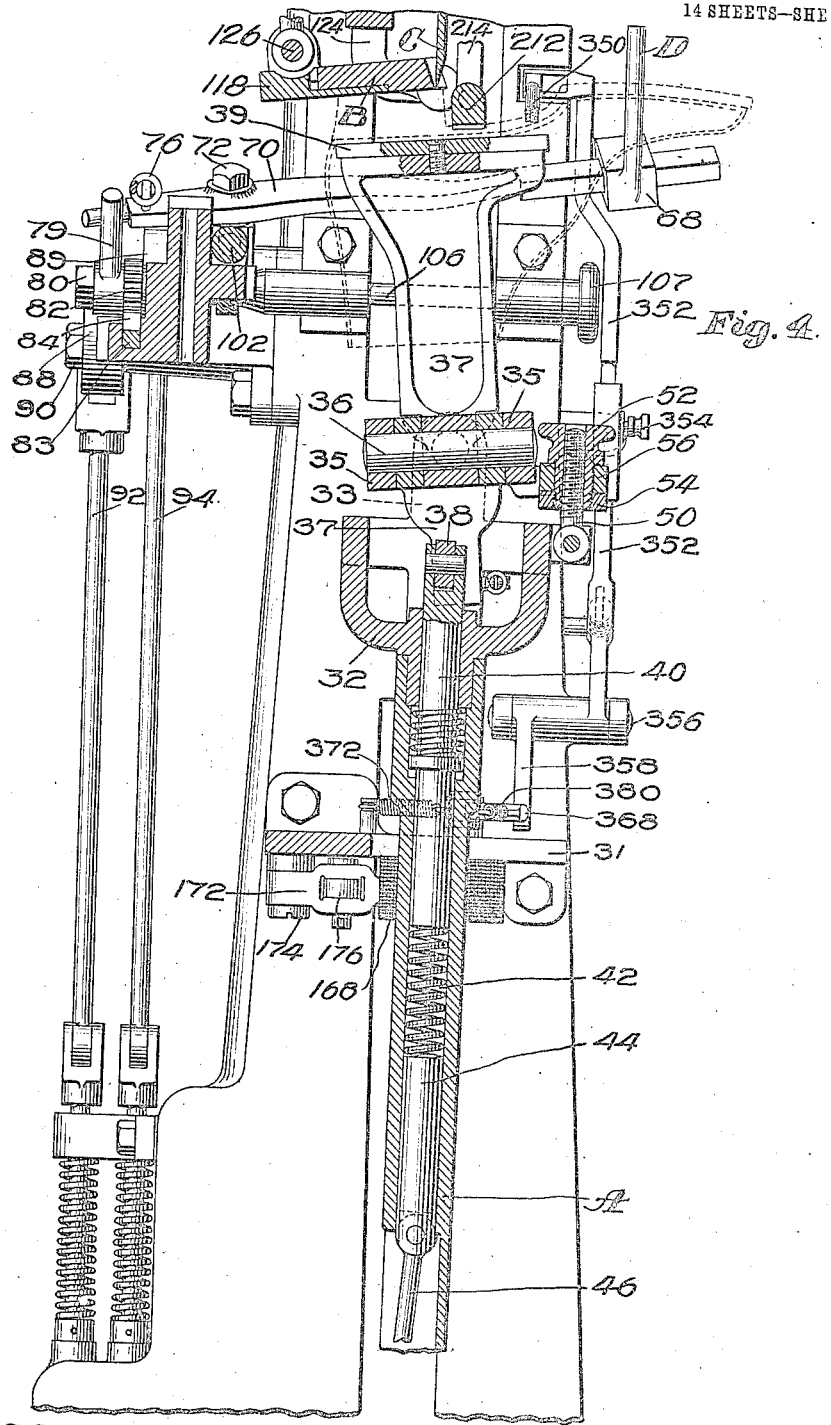

Figure 1 is a side elevation of the machine, showing one form of work support in its inoperative position; Fig. 2 is a front elevation of the upper part of the machine as viewed from the right in Fig. 1, a portion of the machine frame being broken away; Fig. 3 is, in part, a front elevation of the lower part of the machine viewed from the right in Fig. 1; and is in part a vertical section on a line 3—3 of Fig. 11; Figs. 2 and 3, taken together, supply a substantially complete front elevation of the entire machine, on a scale enlarged from that of Fig. 1; Fig. 3ª is a detail elevation, partly in section, of a part of the starting and stopping mechanism; Fig. 4 is a section of one form of work governing means, on a vertical plane extending from front to rear of the machine and indicated by a line 4—4 in both Figs. 2 and 3; Fig. 5 is a section of an expansible jack, and associated parts, on a line 5—5 of Fig. 1—Fig. 5 showing the jack expanded; Fig. 6 is a horizontal section on a line 6—6 of Fig. 1 (said line being shown also in Fig. 10) showing in plan view certain of the work governing devices; Fig. 7 is a rear elevation of the parts shown in Fig. 6, viewed in the direction of an arrow 7 in Fig. 6; Fig. 8 is a horizontal section on the same plane as that of Fig. 6, showing a form of shoe governing means preferred to be employed when breasting shoes which are mounted upon wooden lasts; Fig. 9 is a vertical section on a line 9—9 of Fig. 8; Fig. 10 is a vertical, central section on a plane extending from front to rear of the machine and indicated by a line 10—10 of Fig. 2; Fig. 11 is a vertical section from the same view point as Fig. 1, on a plane indicated by a line 11ª—11 of Fig. 3; Fig. 12 is a horizontal section on a line 12—12 of Fig. 11, said line being shown also in Fig. 3; Fig. 13 is a horizontal section on a line 13—13 of Fig. 3, showing in section (upon the left) a work support and devices for holding it in its adjusted operative position; Fig. 14 is a vertical section on a line 14—14 of Fig. 13; Fig. 14ª is a detail horizontal section on line 14ª—14ª of Fig. 5; Fig. 15 is a horizontal section on a line 15—15 shown in Figs. 2 and 10; Fig. 16 is a horizontal section on a line 16—16 shown in Figs. 2 and 10; Fig. 17 is a horizontal section on a line 17—17 shown in Figs. 2 and 10; Fig. 18 is a horizontal section on a line 18—18 shown in Figs. 2 and 10; Fig. 19 is a vertical detail section on a line 19—19 of Fig. 2, showing a breasting knife and associated parts in their normal inoperative positions; Fig. 20 is a detail view of the parts shown in Fig. 19, indicating their positions at the completion of a breasting operation; Fig. 21 is a detail like that of Fig. 20, showing the same parts as they are withdrawing to their normal positions, after the completion of the breasting operation; Fig. 22 is a horizontal detail section on a line 22—22 shown in Figs. 2 and 10; Fig. 23 is also a horizontal detail section on a line 23—23 shown in Figs. 2 and 10; and Fig. 24 is a vertical detail section, to be referred to, of certain parts shown in Figs. 19, 20 and 21.

Referring now to Fig. 1, a shoe to be breasted is sustained upon the upper extremity of a work support A which comprises a hollow post, pivoted at its lower end on a fixed stud 30 projecting from the machine frame, said post being movable on its pivot from the position shown in Fig. 1, where it is conveniently accessible to the operator for the introduction of the shoe, to a position (Fig. 10) wherein it stands beneath the breasting knife C. The work support A is guided and supported against lateral displacement during movement about its pivot, by means of a guide slot (Fig. 13) formed in a table 31 mounted rigidly on the machine frame.

Referring now to Figs. 1, 4 and 5: seated in the enlarged upper extremity of the hollow post of the work support A is the base of a jack standard 32. This standard 32 comprises arms 33, 33 in which are journaled trunnions 34, 34, of a gimbal 35. Mounted in the gimbal 35 is a stud 36 which has its axis disposed substantially perpendicularly to that of the trunnions 34, 34; and upon the stud 36 are mounted the two scissor-like members 37, 37, constituting one form of expansible work support, shown herein as a jack (Fig. 5). Each of the jack members 37, 37 has a downwardly extending arm; and the arms are connected by a spring which tends to hold the jack in its normal closed or contracted condition. This spring is opposed for expanding the jack, by a vertically movable roll 38 (Figs. 4 and 5) which is interposed between the downwardly projecting arms of the jack members 37, 37. When the roll 38 ascends, as presently described, it expands the jack members 37, 37 by an action similar to that of opening scissor blades. As best shown in Figs. 4 and 5, each jack member has at its upper extremity a horizontally disposed plate 39, loosely pivoted to the jack member. Each plate 39 extends laterally somewhat beyond the adjoining surface of the jack member; and through the lateral edges of the plates 39, 39 the jack when expanded engages a shoe. The pivoting of the plates 39 permits them to assume various positions in conformity to the interior shapes of the shoe against which they are pressed by the expanded jack.

Referring now to Fig. 1: the roll 38 is journaled in the bifurcated upper end of a plunger 40, mounted in the work support A and normally depressed by an appropriate encircling coil spring which bears at its upper end against the lower edge of the jack base 32. To expand the jack, the plunger 40 is moved vertically upward; and in order that the expansion of the jack shall be yielding, the plunger 40 is given its vertical movement through the agency of a compensating spring 42, also mounted in the work support A, and interposed between the plunger 40 and its actuating plunger 44. A link 46 connects the lower end of the actuating plunger 44 with a collar 48 fixed upon the stationary stud 30 in the machine base. The link 46 is pivoted to the collar 48 eccentrically of the stud 30, in such a manner that movement of the work support A about its pivot toward the left in Fig. 1, has the effect of moving the upper extremity of the link 46 vertically upward in relation to the work support. Thus, whenever the work support is moved from its shoe receiving position (Fig. 1) toward its operative position (Fig. 4) the actuating plunger 44 will be elevated, it will compress the spring 42, elevate the plunger 40, force the roll 38 vertically upward between the depending arms of the jack members 37, 37 and will expand the latter. A shoe having been placed upon the jack when in its shoe receiving position, the expansion of the jack will serve to grasp the shoe firmly from within; and the shoe will be held thus firmly while the jack remains in operative position (Fig. 4) and until it is returned to its shoe receiving position shown in Fig. 1.

Referring again to Figs. 1, 4 and 5: it has been stated that the expansible jack with its shaft 36 is mounted upon a gimbal 35, trunnioned in the jack standard 32. The axis of the gimbal trunnions 34, 34 is disposed transversely to the length of a shoe, so that movement about said axis will serve to incline the tread face of a heel at different angles to the horizontal. Provision is made for securing the jack in adjusted position about the axis of trunnions 34, 34, so as to predetermine, if desired, the angle between the breasting knife C and the tread face of the heel, so that the tread angle or pitch of the finished breast may be definitely regulated in advance and may be varied as circumstances require. To the end just suggested, the jack base 32 has an ear in which is pivoted an eye-bolt 50, the threaded portion of the eye-bolt being engaged by an adjusting nut 52 (Fig. 4). The nut 52 has a collar 54 at its lower extremity, which supplies one side of an annular groove on the nut; and in said groove is a sleeve 56. This sleeve 56 is mounted on trunnions 58, journaled upon an ear extending from the gimbal 35. With this arrangement the entire jack head, comprising the members 37, 37, may be adjusted angularly on the trunnions 34, 34 by turning the adjusting nut 52; and the jack will be held in whatever adjusted position it has been given.

To summarize: the specific work support A disclosed for purposes of illustration is movable from a shoe receiving to an operative position. The work support comprises an expansible jack, arranged to clamp a shoe from within while the latter is undergoing the breasting operation. The jack is made angularly adjustable so as to provide for varying the tread-angles of heel breasts.

It will be observed that the specific form of expansible work support which has been described is intended to be used as a jack in the absence of a wooden last—that is to say, the wooden last upon which the shoe is mounted during most of the shoe making operations would be removed before introducing the shoe to the jack members 37, 37. If, however, it be desired to breast shoes on wooden lasts, it is convenient to substitute for the jack form of work support hereinbefore described some such arrangement as is shown in Fig. 9. As disclosed by way of exemplification in Fig. 9, the work support arranged to receive a last, comprises a base 59, mounted in the upper end of the work support A. Trunnioned on the base 59 is a unitary jack member 60, having a last pin 62. This form of work support or jack has provision for the angular adjustment already referred to; and this provision includes an eye-bolt 64 and adjusting nut 66, similar both in construction and mode of operation to the eye-bolt 50 and the nut 52 already described. For convenience of illustration the work support of Fig. 9 is not shown as expansible. Either of the described forms of work support or jack may be employed in connection with suitable means to perform the intended work of the machine; but it is preferable to use a construction embodying features of the invention as exemplified in the expansible members 37, 37, though this is not indispensable.

Referring again to Fig. 1: when the shoe has been properly placed upon the shoe support A, the latter is moved to the left until the shoe heel stands beneath a presser-foot B. Thereupon, by treadle-operated mechanism hereinafter described, the presser-foot is moved down to engage the heel with sufficient firmness to assist in holding it in any position to which it may be moved, without preventing its ready manipulation by the operator. This same treadle operation which initially introduces the presser-foot is conveniently utilized also for presenting in operative position one of a pair of side gages D by which the adjustment of the shoe in a horizontal plane may be determined by moving some portion of the shoe into contact with the then stationary side gage.

The gages D, D are shown in their inoperative and preferably normal positions, in front elevation in Fig. 2, in detail plan view in Fig. 6, and in rear elevation in Fig. 7. The operative position of one of the gages, with relation to a shoe, is shown in dotted lines in Fig. 6.

As illustrated in Fig. 2, each gage D consists of a vertically disposed pin integral with a block 68 which is adjustably mounted on a squared outer extremity of a gage arm 70. Each gage D may be adjusted endwise on its arm 70 and may be fixed in adjusted position by a set screw 73. The arms 70, 70 are fulcrumed on stud bolts 72, 72, mounted in blocks 74, 74. The axes of the stud bolts 72, 72 are inclined so that when one of the arms 70 stands in its inoperative position it shall be displaced not alone laterally from the shoe, but also vertically, so as to be removed entirely from a position of interference with the shoe adjusting movements. When an arm 70 is moved into operative position it travels at once downwardly and toward the shoe. One of the gages D is shown in the drawings at a greater elevation than the other (as for example in Fig. 7). Both gages as shown in Fig. 7 occupy their normal inoperative positions; but the gage on the left is held in the position shown by the interference of the machine frame.

The rear extremities of the gage arms 70, 70 are connected by a spring 76 which tends to separate the gages D, D and to hold them in their inoperative positions. The action of the spring 76 is limited and controlled by means of gage throwing fingers 78, 79, fulcrumed on pins 80, 80 in a bracket of the machine frame. When it is desired to throw one or the other of the gages D into operative position the appropriate finger 78 or 79 is rocked on its pivot 80 and thereby its associated gage arm 70 is moved on its fulcrum 72. While one of the fingers 78 or 79 is thus moved the other remains stationary, supplying an abutment against which the spring 76 tends to move the then inactive arm 70. With this arrangement the movement of an arm 70 is made in opposition to the spring 76, one end of which is held stationary by the inactive finger 78 or 79. The fingers 78 and 79 are moved to the ends just suggested through pinions 82, 82 (Fig. 6) rigidly connected each to one of the fingers 78, 79. One pinion 82 is engaged by a horizontally movable rack 83 and the other is engaged by a second and independent rack 84. The racks 83 and 84 are mounted for endwise movement in ways supplied on the side gage bracket of the machine frame.

Referring again to Fig. 7: the left hand end of each rack 83, 84 carries a cam roll 86, engaging a segmental cam path on a cam block 88 or 89. The cam blocks 88 and 89 are pivoted respectively on stationary pins 90, 90. The cam blocks 88 and 89 have lever arms to which are connected respectively treadle rods 92 and 94. Evidently, when one of the treadle rods is moved vertically upward its cam is moved clockwise in Fig. 7, so as to reciprocate one of the racks 83, 84 in proper direction to rock a finger 78 or 79 and throw one of the gages D, D into operative position.

The gages D, D are intended to be used alternatively, one for right shoes and the other for left shoes, it being preferable, for the purposes of the specific machine, to use that gage which is in a position to coöperate with the inner edge of a shoe sole. For example, the dotted lines in Fig. 6 show the operative position of a gage which coöperates with the inner sole edge of a left shoe.

In order that the operator may at will introduce the gage which is appropriate to the shoe about to be breasted, right and left treadles are provided for operating, respectively, the treadle rods 92 and 94. Thus, when a right shoe is on the work support the operator depresses the right treadle and elevates the treadle rod 92 to throw in the gage D which is on the right of Fig. 7 and on the left of Fig. 6. In like manner, to introduce the gage for a left shoe the operator depresses the left treadle, elevates the treadle rod 94 and introduces the gage D on the left of Fig. 7 and on the right of Fig. 6, as shown in dotted lines in the latter figure. These treadles are shown in side elevation in Fig. 11 and in plan view in Fig. 12. The treadle 96, when depressed, introduces a gage for a left shoe and the treadle 98 introduces a gage for a right shoe.

It has been explained that the operator first swings the work support A to the left in Fig. 1 and thereupon, by depressing a treadle, moves the presser-foot B into contact with the heel and at the same time introduces into operative position one or the other of the gages D. When a gage is thus introduced the operator may, if necessary, swing the forepart of the shoe laterally until it contacts with the then stationary gage; and the shoe being held thus throughout the breasting operation the gage D serves to determine the angle between the operative position of the breasting knife and the longitudinal median of the heel. The adjustment of the gage blocks 68, 68 lengthwise of the arms 70, 70 permits the gages to be positioned properly to contact with any desired point on a sole edge; and by means of this adjustment the gages D, D may be moved toward and from the axes about which they swing. This feature of adjustment may be utilized for varying the median angle or swing of the breast line determined by the gages respectively, since by moving a gage toward and from the axis on which it swings its operative position may be shifted slightly with relation to the longitudinal median of a shoe. It is preferred, however, to have a further adjustment of the gages for varying their operative positions and thereby varying the median angles of breasts; and, to supply this preference, the blocks 74, 74 (Fig. 7), upon which the gage arms 70 are fulcrumed, are mounted in slide ways in their supporting bracket so as to be movable toward and from each other. The blocks 74, 74 are engaged by a right and left threaded screw 100, which is held against axial movement by engagement of its rigid collar 102 with a recess in the supporting bracket. One end of the screw 100 has a spiral gear 104 which, in turn, is engaged by a spiral gear on a shaft 106 having a handle wheel 107 at its end in position to be conveniently accessible to the operator as he stands at the front of the machine. By turning the handle wheel 107 the operator rotates the screw 100 and thereby moves the blocks 74, 74 toward or from each other reciprocally. This serves to adjust the starting positions of the gages D, D, from which they move toward their operative positions. The throw of each arm 74 (actuated by a finger 78 or 79) is always of the same extent and consequently, the above described variations in the starting points of the gages serve to vary the operative positions in which the gages shall stand at the end of their movements.

Whatever horizontal angular adjustment of the shoe is necessary to bring the sole edge into contact with its appropriate gage D, may be effected by moving the entire jack head and base angularly in its seat in the work support A, this movement taking place about the axis of the latter. This movement is readily effected by simply moving the shoe, since the latter is then tightly clamped from within so as to be substantially rigid with the jack.

In breasting shoes mounted upon wooden lasts, as hereinbefore suggested, the engagement between the last pin 62 (Fig. 9) and its socket in the last is very rarely sufficiently snug to hold the last and shoe rigidly on the jack and for this reason it is preferable that some means be provided for centering the shoe with relation to the work support. To this end (Fig. 8) counter clamps 108, 108 are provided to engage, preferably by rolls or the like, the counter of the shoe and to hold the latter centered between the rolls. The clamps 108, 108 are fulcrumed respectively or pins 110, 110 mounted in a block 112 which is removably secured to the same bracket which supports the side gage arms 70. The clamps 108 have intermeshing sector gear arms which insure that the movements of the clamps shall be reciprocal. The clamps are normally pressed together with considerable clamping force by a spring 114. The block 112 which supports the clamps 108, 108 is removably attached to its supporting bracket by a long screw 116 (Fig. 9). When it is not desired to breast shoes on the last the clamps 108 may be readily removed by unscrewing the screw 116, and lifting away the clamp block 112. As the shoe is moved from the position of its introduction rearwardly with the work support, the counter of the shoe is pushed between the clamps 108, 108 which thereupon automatically center the shoe and hold it thus centered while permitting it to be shifted into proper relation with a gage D.

It has been explained hereinbefore that a single treadle operation serves both to move a gage D into operative position and to lower the presser-foot B into contact with a heel. It is convenient to describe next the construction of the presser-foot, and the manner in which it is introduced preliminarily by the treadle.

Referring now to Figs. 10, 15, 16, 17 and 18: the presser-foot B comprises a block removably supported in the bottom of a presser-foot carriage 118. As shown in Fig. 18, the presser-foot B is mounted in ways in the carriage 118 and is arranged to be locked in position by means of a spring plunger 120 on the carriage, which enters an appropriate hole in the edge of the presser-foot and maintains the latter in its proper position. The front edge of the presser-foot is preferably curved in substantially the shape which is desired to be given the heel breast; and when the presser-foot is in operative position its curved edge stands closely adjacent to the path of vertical movement of the knife. Thus, the presser-foot edge may serve as a gage since it indicates with fair accuracy the line which the knife will cut. The presser-foot B is readily removable from its carriage so as to be replaced by others having differently shaped gaging edges. The presser-foot carriage 118 is mounted upon trunnion pins 122 at the bifurcated lower extremity of a presser-foot plunger 124. The carriage is also pivoted to an eye-bolt 126 having an adjusting nut 128 pivotally mounted in an ear in the presser-foot plunger 124. By turning the adjusting nut 128 (Fig. 10) the presser-foot carriage, and with it the presser-foot B, may be adjusted angularly about the trunnions 122; and in this manner the inclination of the lower face of the presser-foot may be made to accommodate itself to any desired tread angle. The presser-foot plunger 124 (Figs. 15 and 16) is mounted in a vertical slide-way in the machine frame and is connected (Fig. 10) by a screw 130 and adjusting nut 132 with an oppositely threaded screw 134, pivoted at the end of a presser-foot lever 136. The adjusting nut 132 carries a spline engaging the interior of a hub of a bevel gear 138 mounted against endwise movement in the machine frame. A second bevel gear 140 engages the gear 138. The gear 140 is rigidly mounted on a handle wheel shaft 142. By turning the shaft 142 the nut 132 is rotated, thereby adjusting the relation between the presser-foot and the presser-foot lever 136. The spline on the adjusting nut 132 permits any practicable extent of vertical movement of the nut while at the same time maintaining constant engagement with the gear 138.

Referring now to Fig. 2: the presser-foot lever 136 is fulcrumed on the frame of the machine and is normally rocked to hold the presser-foot elevated by means of a retracting spring 144. Depending from the end of the presser-foot lever 136 is a treadle rod 146 which, at its lower end (Fig. 11), is connected to a lever 148, fulcrumed upon the frame of the machine at 149. The end of this lever, opposite its fulcrum, is of sufficient lateral extent to overlie both of the treadles 96 and 98 and the latter, when moved by the operator, engage the lever 148 by means of rolls 150. Thus, when either one of the treadles is depressed its roll 150, being thereby elevated, will rock the lever 148 clockwise in Fig. 11; will thereby elevate the rod 146 (Fig. 2); rock the presser-foot lever 136 contra-clockwise in Fig. 2; and depress the presser-foot until it contacts with a heel.

Heretofore the description has been devoted to the work governing means of the machine, including the work support and expansible jack, the side gages, the shoe centering devices and the presser-foot. The power operation of the machine is started preferably after the shoe has reached its final adjusted position; and this power operation, in its initial stages, acts to force the presser-foot solidly against the heel, thereby clamping the latter firmly upon the work support; and at the same time locks the work support A in its then adjusted position. In this manner the shoe is held rigidly in its proper relation to the breasting tool and is there maintained until, during the latter stages of the power operation, the presser-foot is retracted and the work support is unlocked to permit its return to shoe receiving position. The power actuation of the presser-foot will be described first.

Referring to Fig. 2: connected to the presser-foot lever 136 (in addition to the treadle rod 146) there is a cam actuated rod 152. This rod is in two parts; and between its parts, is interposed a compensating spring 154. At the lower end of the rod 152 (Fig. 11) is secured a vertically adjustable block 156; and fixed to said block is a slide pin 158 mounted in ears 159, 159 of the machine frame. Pivoted to the lower extremity of the slide pin 158 in a link 160 which is also pivoted to a cam lever 162 (dotted lines Fig. 3) which is shown in plan in Fig. 12. The cam lever 162 has a cam roll engaging a presser-foot path cam 164 mounted on the main shaft of the machine. The shape of this cam is such that, as soon as the machine is started, the cam lever 162, the slide rod 158 and with it the presser-foot cam rod 152 are forced vertically upward, thereby rocking the presser-foot lever 136 and forcing the presser-foot down upon the heel of the shoe. The compensating spring 154 (Fig. 2) permits the rod 152 to yield axially in response to varying thicknesses of heel interposed between the jack and the presser-foot. The presser-foot having been thus actuated to clamp the heel firmly in place, the presser-foot cam path 164 dwells until the machine is about to stop, whereupon it releases the cam lever 162 to its normal position and permits the elevation of the presser-foot by its spring 144 (Fig. 2). The upward movement of the presser-foot cam rod 152 is utilized to lock the work support A in its adjusted position, and the manner in which this is effected will be explained next.

Referring to Fig. 3: there is shown in this figure a table 31, secured to the frame of the machine and having a guide slot— shown also in Fig. 13—through which the work support moves to and from its operative position. Rigidly mounted on the work support A (Figs. 3, 13 and 14) is a knurled locking surface 166 and when the work support stands in operative position as shown in Fig. 13 the knurled surface 166 stands adjacent to a second and movable knurled locking surface 168. The knurled surface 168 is formed upon a locking member comprising a plunger 170 arranged to be reciprocated toward and from the work support A in suitable bearings provided upon the lower side of the table 31. At its inner end the plunger 170 is pivoted to a locking lever 172, fulcrumed at 174 to the table 31. Between the plunger 170 and the fulcrum 174 the lever 172 has pivoted to it an actuating pin 176, normally spring pressed to the right in Fig. 13 to hold the knurled surface 168 out of engagement with the coöperating surface 166 on the work support A. At its end the actuating pin 176 has a cam roll 178 to be engaged at appropriate times by a cam 180, rigidly clamped upon the presser-foot cam rod 152. The cam 180 is shown in dotted lines in side elevation at the top of Fig. 3. As the presser-foot cam rod 152 is elevated to depress the presser-foot the cam 180 moves the roll 178 to the left in Figs. 3 and 13 and thereby rocks the locking lever 172 clockwise in Fig. 13 and forces the knurled surface 168 into locking engagement with the knurled surface 166 on the work support A. Thus, with the power depression of the presser-foot, the work support A is locked in position. It is preferable that the work support A be locked in position slightly in advance of the final power depression of the presser-foot; and the locking cam 180 on the presser-foot cam rod 152 is suitably positioned on the latter to secure the proper timing to this end. When a shoe has been properly adjusted; when the work support has been locked in adjusted position, and the presser-foot has been forced down upon the heel to clamp the latter securely in place, all is in readiness for the breasting operation which thereupon ensues, actuated by the continued power operation of the machine. It is expedient at this point to describe the construction and mode of operation of the breasting knife. Tools of various sorts may be employed for cutting or otherwise shaping the heel breasts and these tools are conveniently exemplified by a breasting knife C.

Referring to Fig. 10: the knife C is rigidly mounted in a shank 182. Preferably several knives, of different types, are supplied for use with a single machine and each knife is mounted on a shank 182. Each shank has an adjusting screw 184, vertically disposed in it, the upper extremity of the screw serving as an abutment which, when positioned against a part of the knife carrying slide of the machine, determines the position of the knife shank with relation to said carrier. Obviously, by turning the screw 184 the distance between the screw head and the cutting edge of the knife may be varied; and thereby the position of the cutting edge with relation to the knife carrier may be varied. This adjustment of a knife may be maintained even though the knife be removed from the machine since its adjusting screw 184 constitutes in effect a part of its shank and is removed with it. When the knife is returned to position, therefore (the screw 184 having in the meantime remained undisturbed), the knife blade may be returned to its former adjustment in relation to the knife carrier. This is of great convenience, since it is frequently desirable to remove a knife and with the arrangement contemplated by this feature of the invention this may be done without necessitating any readjustment of the knife when it is replaced.

The knife shank 182 is secured rigidly upon a knife carrier 186, the carrier having an ear 188 in which is supplied a vertical aperture. In introducing the knife, the adjusting screw 184 is inserted vertically in the aperture of ear 188 and the head of the screw is moved upwardly until it abuts against an overhanging portion of the slide 186. The knife is thereupon clamped firmly to the slide 186 by means of a clamping screw 190, mounted in a cross piece 192 fastened to the knife slide 186. These parts are shown in horizontal section in Fig. 17. As an additional means for holding the knife on the slide 186, it is preferred to employ a locking block 187 (Figs. 10 and 23) which straddles and engages from beneath the head of the screw 184. The block 187 fits in a seat in the knife carrier 186 and is readily removable. It is held in position by a turn key 189 (Figs. 2, 10 and 23).

As shown in Fig. 10 the edge of the knife on the side remote from the heel is somewhat inclined; and during the cutting stroke of the knife there is a tendency for this inclined edge to force the knife out of its intended vertical path. Also, other influences may tend to flex or otherwise move the knife out of its proper path. To prevent this, the vertically reciprocating knife carrier 186 (see Fig. 2) has downwardly projecting arms 191, 191, adjacent the lateral edges of the knife; and each of said arms is equipped with a knife holding block 193, shown in section in Fig. 18. The blocks 193 have vertically extending grooves appropriately shaped to receive the edges of the knife; and the blocks are so seated in the arms 191 as to hold the knife rigidly against any tendency to bending or other movement out of its true path. The blocks 193 are removable from their seats in the arms 191 and are held in place merely by the presence of the knife between them engaging their guide grooves. When a knife is removed the blocks 193 may be replaced by others having grooves to suit a knife of different shape. With the knife holding and clamping organization just described, the knife is held rigidly though adjustably upon its knife carrier 186, and it is confined to its vertical path.

The knife is given its vertical cutting stroke by reciprocating the slide 186 which is well shown in cross section in Figs. 15 and 16. It moves vertically in guide ways in the machine frame and to engage said guide ways it has tongues 194, 195 and 196. Referring now to Figs. 2, 15 and 16: the slide 186 has upon its right hand end integral ears 197, to which is pivoted the upper extremity of a knife actuating rod 198. As shown in Fig. 3, this rod 198 is made in two parts and between said parts is interposed a cushion spring 200. The lower extremity of the rod 198 is rigidly connected to an eccentric strap 202 encircling an eccentric 204 on the main shaft of the machine. As said main shaft is rotated the eccentric 204 first depresses the knife and then elevates it. The cushion spring 200 bears at its lower end upon an adjusting screw collar 206 which threads into the lower end of a sleeve 208 rigidly mounted at the lower end of the upper section of the rod 198. The lower section of the rod 198 projects into the sleeve 208 and, within said sleeve, it has a collar 210 upon which the upper end of the cushion spring 200 bears. Thus, as the lower section of the rod 198 is depressed by the eccentric on the main shaft the collar 210 compresses the spring 200 which, through the sleeve 208, depresses the upper section of rod 198 and thereby also depresses the knife carrier 186 and the knife. The eccentric 204 is shown in its position of rest in Fig. 3. The first action of the eccentric upon the starting of the machine is to begin depression of the knife. As the eccentric 204 completes one revolution the collar 210 bears against the inside of the sleeve 208 and positively elevates the knife to its normal position shown in Fig. 10. The cushion spring 200 is of such strength that it does not normally yield during the active descent of the knife. It is important, however, that the cutting action of the knife be arrested in sufficient season to prevent its cutting beyond the heel and entering the sole of the shoe. To this end provision is made for positively arresting the knife at the desired time, so that any further movement of the eccentric will be absorbed in compressing the spring 200 which yields to permit the knife to remain stationary during the remaining throw of the eccentric. The manner in which the knife is thus arrested needs next to be described.

In breasting machines long well-known in the art, it has been common to arrest the movement of a breasting knife by means of a bunter, rigid with the knife, which strikes against the sole of a shoe as the knife completes its cut, and is intended thereupon to prevent further movement of the knife. There are several objections to such an arrangement. The shoe may yield when struck by the bunter so as to permit a slight overthrow of the knife by which the latter cuts beyond its intended stopping point. Moreover, the bunter, striking the shoe with considerable force, is likely to abrade or mutilate the latter. More recently in the art it has been attempted to overcome these difficulties by using a bunter which moves with the knife and, upon striking the shoe sole, disorganizes the actuating mechanism of the knife, so as to interrupt the power operation of the latter. A moving breasting knife, however, may acquire considerable momentum and consequently the mere interruption of its actuation without otherwise checking its movement, is not reliable to prevent its overthrow. For this reason, the expedient just described fails to obviate the difficulties encountered and, at the same time, retains the disadvantage of having a bunter strike heavily against the sole of the shoe. Of course a bunter used for disorganizing the knife actuating mechanism may strike the shoe more lightly than the bunters of the earlier art but, nevertheless, it may strike with sufficient force to mutilate the shoe sole.

To avoid the above suggested difficulties, the illustrative machine is provided with means for arresting the operation of a breasting tool, which, in the specific illustration, is adjustable to proper position (preferably by placing it in contact with a shoe sole); when adjusted, is supported independently of the shoe; and, when so supported, supplies a stationary abutment independent of the shoe which may be employed in arresting the breasting operation. Hereinafter the expression "breasting stop" will be used, for convenience, to signify means to stop the breasting operation, whatever the character or mode of operation of such means.

A convenient form of breasting stop is illustrated in Fig. 10. In said figure the breasting stop 212 is shown in its normal inoperative position, elevated above the shoe sole. Referring now to Fig. 2: the breasting stop 212 is mounted upon trunnions 213 at the lower extremities of breasting stop slides 214. The slides 214 are shown in horizontal section in Figs. 15, 16, 22 and 23. A detail vertical section of one of the trunnions 213 is shown in Fig. 24. The breasting stop 212 is moved downwardly, preliminarily to the breasting operation, until it contacts with the sole of a shoe at the shank; and after the breasting operation it is again elevated to its normal position. This vertical reciprocation of the breasting stop is effected, in the specific machine, by means of pinions 216 (Figs. 2 and 10) engaging respectively racks 217 (Fig. 10) formed upon the breasting stop slides 214. The pinions 216 are mounted rigidly upon a shaft 218, journaled in the frame of the machine and (Fig. 2) a third pinion 220 on the shaft 218 engages a vertically reciprocated rack 222. The rack 222 is formed at the upper extremity of a sleeve containing a compensating spring 224, said spring bearing at its upper end against the interior top well of the sleeve. The lower end of the spring bears against the enlarged upper end of a breasting stop actuating rod 226. The lower end of the rod 226 is pivoted to a cam lever 228, fulcrumed at 230 to the frame of the machine and having a cam roll 232 in a breasting stop path cam on the main shaft of the machine. The breasting stop cam is so shaped that it elevates the rod 226 and through the spring 224 depresses the breasting stop, during the initial stage of the power operation of the machine and just subsequently to the locking of the work support A and the power depression of the presser-foot B. The action of the breasting stop cam in elevating the rod 226 compresses the spring 224 and, consequently, the breasting stop is yieldingly pressed against the shoe shank and is there held until, as presently described, the breasting stop slides 214 are rigidly clamped to the frame of the machine.

As shown in Figs. 15 and 16, the ways in which each slide 214 is mounted are formed on one side by a plate 234 supplied by part of a depending arm of the machine frame, and on the opposite side by a block 236. Referring now to Fig. 2: each block 236 is pivoted at its upper extremity to a pin 238 on the frame; and depending from its pin, it normally lies against its adjacent slide 214 without impeding the movement of the latter. The pivoted blocks 236 constitute the clamps whereby the slides 214 are rigidly clamped to the machine frame by being gripped between the blocks 236 and the plates 234 (Fig. 15). The lower end of each block 236 is split and just above the split portion is an inclined cam surface 240. To engage the cam surface 240 clamping rollers 242 are mounted upon the knife carrier 186, each roll being journaled upon the end of a lever 244, fulcrumed upon a pin 246 (Fig. 15) threading into the knife slide 186. As shown in Fig. 15, each pin 246 is encircled by a torsional spring 248 which tends to rock a lever 244 contra-clockwise in Fig. 2 and thereby serves to hold a roller 242 at all times against a clamp block 236. During the descent of the knife carrier 186, the rolls 242 are carried downwardly with it; and during their descent they engage the cam surfaces 240, thereby forcing the clamp blocks 236 toward each other, so that each acts to grip a breasting stop slide 214 securely between the block and one of the plates 234 on the frame of the machine. Thus, wherever the breasting stop 212 may stand it will be firmly clamped in position during the early stages of the descent of the breasting knife, and will thereafter be rigidly sustained by the frame of the machine.

It has been explained that the knife carrier 186 has secured to it a cross plate 192. Mounted in this cross plate (Fig. 10) is a vertically adjustable bunter 250, the stem of which threads into an adjusting nut seated against axial movement in the cross piece 192. This bunter partakes of the vertical reciprocation of the knife carrier 186 and its rigidly attached knife. The breasting stop 212 stands, whatever its position in relation to the shoe, always in the path of the bunter 250 and, in consequence, the descent of the knife will be invariably limited by the position in which the bunter encounters the breasting stop 212.

To summarize: when the shoe has been properly adjusted and secured in position, as already described, the power operation of the machine moves the breasting stop 212 yieldingly against the shank of the shoe. Shortly thereafter the descent of the knife carrier 186 clamps the breast stop slides 214 securely to the machine frame and there holds them while further descent of the knife causes its rigidly connected bunter 250 to strike against the breasting stop 212, whereupon the bunter and the knife are positively arrested. Subsequently the continued power operation of the machine elevates the knife to its normal position and also withdraws the breasting stop 212 upwardly to its normal position.

Ordinarily a breasting operation severs a chip or fragments of leather from the breast of the heel; and such fragments, usually remaining upon the shank of the shoe, have required heretofore to be torn or brushed away by hand, thus frequently inducing the operator to place his hand beneath the breasting knife. One feature of this invention avoids the necessity for this hand operation by providing means for removing the chip. A practicable form of chip removing means is shown in Figs. 19, 20 and 21.

In Fig. 19 the breasting knife C and the breasting stop 212 are shown in their normal elevated positions. In Fig. 20 the same parts are shown in the positions which they occupy just at the completion of the breasting operation, the knife standing then at the lowermost limit of its movement toward the shoe. Fig. 21 shows a stage subsequent to that illustrated in Fig. 20, in which the knife has ascended slightly, the chip removing means accompanying the knife upwardly and conveying the chip away from the shoe. The immediate chip removing means is exemplified by a chip engager 252. There may be one or more of these chip engagers, disposed along the width of the heel breast. The particular engager 252 has a transverse pin 254 upon which it is fulcrumed, permitting its lower end to rock toward and from the chip. The fulcrum pin 254 of the chip engager enters slots 256 in a breasting stop slide 214, the slide being appropriately recessed to receive the chip engager and the slots being made in opposite sides of the recess. The upper end of the chip engager rests against a leaf spring 258, which tends constantly to rock the former contraclockwise in Fig. 19. The upper portion of the chip engager is split and one of its bifurcations constitutes a spring arm 260 which, when acted upon as presently described, serves to rock the chip engager clockwise in Fig. 19, in opposition to the leaf spring 258. The extreme upper end of the chip engager is appropriately beveled to engage a cam 262 fixed upon the vertically reciprocating knife carrier 186. The lower extremity of the chip engager has a toe 264, arranged to be projected beneath the lower edge of the chip.

The parts being in the positions shown in Fig. 19, the breasting stop 212 is first depressed until it takes up the position shown in dotted lines in Fig. 19, in which the leaf spring 258 holds the toe 264 of the engager away from the chip. During the descent of the knife carrier 186 the cam 262 strikes the upper end of the chip engager and rocks the latter clockwise in Fig. 20, so that its toe is projected beneath the chip. Further descent of the knife presents to a latch 266 on the chip engager a latching notch 268, whereby the chip engager is elevated when the knife next ascends. When the parts stand in the position shown in Fig. 20 the leaf spring 258 holds the latch 266 in engagement with its latch notch 268 and the spring arm 260 of the chip engager holds the toe of the engager beneath the chip and causes the engager to clamp the chip firmly against the rear of the knife. Hereupon the knife carrier 186 begins its ascent, carrying upwardly the chip engager and the chip held between the engager and the knife. This movement may serve to tear the chip away from the heel in the event of its having been incompletely severed. During this upward movement of the knife carrier and chip engager the latter presently strikes at its beveled upper end against an inclined cam surface 270 on the stop slide 214, which acts to rock the engager clockwise in Fig. 21 and to disengage its latch 266 from the latching recess, permitting further upward movement of the knife while detaining the chip engager. When the knife has ascended to about the position indicated in Fig. 21 the breasting stop 212 begins also to ascend and the parts disposed in substantially the relations indicated in Fig. 21 rise in unison, carrying the chip with them. After the knife, the breasting stop 212 and the chip engager have been ascending for a short interval of time the engagement between the upper beveled end of the engager and the unlatching cam 270 takes place, and thereupon continued upward movement of the knife carrier 186 withdraws the cam 262 from engagement with the spring arm 260 of the engager and permits the leaf spring 258 to rock the engager contraclockwise in Fig. 21. This releases the chip and permits it to fall.

As shown in horizontal section in Fig. 17, there are preferably two chip engagers 252 mounted respectively in the breasting stop slides 214. These two engagers may operate in unison so that both shall release a chip at the same time and drop it vertically upon the shoe sole; or if desired they may be timed to release one side of a chip earlier than the other so as to drop the chip cornerwise upon the sole from which it will bound or roll off laterally. The proper timing to this end may be effected easily by prearranging the relations of the engagers and their respective unlatching cams 270 (Fig. 20) so that one cam shall act earlier than the other. Thus the two chip engagers may coöperate to tear a chip away from a breast, or otherwise remove it, and then to release it and let it drop.

In order to remove from a shoe sole any chip or fragments which may rest upon it, the illustrative machine is equipped with chip discarding means conveniently arranged to move a discarding device across the sole as the shoe is drawn forward by the operator after the breasting is completed. The chip discarding mechanism just referred to is best shown in Figs. 5, 13 and 14ª. It comprises a brush 350, which is moved transversely across the shank of a shoe during the movement of the shoe from its operative position to that illustrated in Fig. 1. Referring now to Fig. 5: the brush is mounted upon the upper end of a brush lever 352, formed in two parts adjustably connected by a set screw 354, and fulcrumed upon the frame of the machine at 356. The lower arm of the lever presents a toe 358 by which the brush lever 352 is rocked on its pivot to perform its chip discarding operation. Referring to Fig. 14ᵃ: for the purposes of the specific machine, the upper extremity of the arm 352 is bent at an angle to present the brush, pivoted thereto at 360, in its proper position relative to the travel of the shoe. In order to prevent injury to the parts, which might possibly result from interference of the brush 350 and the breast of a heel as it moves outwardly, the brush is cushioned by means of a spring 362 attached at one end to the lever 352 and at the other end to an ear on the brush, appropriate stop devices of well-known character serving normally to hold the brush in the position shown in Fig. 14ᵃ against the tension of the spring. If a heel should strike the brush 350, the latter would yield contraclockwise in Fig. 14ᵃ and thereby avoid breakage.

The devices for rocking the brush lever 352 to discard a chip are shown in front elevation in Fig. 5 and in plan in Fig. 13, the lever toe 358 being there shown in horizontal section. A lever having a stop arm 364, an actuating arm 366 and a toe-engaging arm 368 is fulcrumed at 370 to the table 31 projecting from the machine frame. A spring 372 holds the three-armed lever normally in the position shown in Fig. 13 with the stop arm 364 engaged by a stop 374 projecting from the table 31. A latch 376 is pivoted to the arm 366 at 378, said arm having a lateral recess to receive one end of the latch, as indicated in dotted lines in Fig. 13. A spring 380 holds the latch normally as shown in said figure, in which position the latch stands when the work support A is moving outwardly toward its inoperative position in the direction of the arrow 382. As the work support thus moves, a stop face 384 strikes the latch 376; rocks the three-armed lever contraclockwise in Fig. 13; rocks the brush lever 352 contraclockwise in Fig. 5; and thereby moves the brush across the shoe shank to discard a chip. When the work support A has passed completely into its inoperative position it is removed from engagement with the latch 376, whereupon the three-armed lever returns to the position shown in Fig. 13 and the brush lever 352 is retracted to the position shown in Fig. 5, by a retracting spring 386 and is there held against a yielding stop 388. When the work support A returns to its operative position there is no necessity for a movement of the brush. Accordingly, the latch 376 acts merely as a by-pass which, when struck by the returning work support is rocked clockwise (Fig. 13) on its pivot 378 in opposition to the spring 380 without affecting the position of the three armed lever. As the work support A passes to operative position it departs from engagement with the latch 376, whereupon the latter returns to operative position.

The machine which has been described heretofore may be started and stopped in any practicable manner. A convenient form of starting and stopping mechanism is shown in Figs. 3, 3ᵃ, 11 and 12.

Referring now to Fig. 11: the main shaft 275 has a loose belt pulley 276, the hub of which is provided with apertures 278 to be engaged by a spring pressed plug on a clutch member 280, rigid with the shaft 275. The clutch member 280 has an axially disposed pocket in which is mounted the plug 282. An encircling spring tends constantly to force the plug 282 into one of the apertures 278 in the hub of the belt pulley. The plug 282 is controlled so as to withdraw it from engagement with the belt pulley, and to hold it in unclutched position, by means of an ear 284 (shown in plan view in Fig. 12) which is rigidly though adjustably fixed to the stem of the plug 282. The ear 284 is held in its normal, inactive position when the machine is at rest by a clutch controlling dog 286 which (Figs. 3 and 3ᵃ) is pivoted to the frame of the machine at 288. Evidently if the dog 286 be rocked clockwise in Fig. 3—that is, if it be elevated from the position shown in Fig. 12—the spring of the plug 282 will force the latter toward the belt pulley; and when one of the apertures 278 presents itself in front of the plug the belt pulley will be promptly clutched to the main shaft. In the operation of the starting and stopping mechanism the dog 286 is first rocked on its pivot in the manner just suggested and when the positive drive of the machine has started, the dog drops again to its stopping position shown in the drawings and at the end of a single revolution of the shaft the inclined end (Fig. 12) of the dog cams off the ear 284 downwardly in Fig. 12 and thereby unclutches the shaft from the driving pulley and holds it unclutched until the dog is again lifted. The dog 286 is controlled to the ends just described by means of a treadle operated tripper rod 290, shown detached in Fig. 3ᵃ.

Referring now to Fig. 11: a roller mounted in the lower extremity of the tripper rod 290 overlies the end of the lever 148 which has already been referred to as communicating the movement of either the right or left treadle to the presser-foot treadle rod 146. When either one of the treadles is depressed the lever 148 will be rocked clockwise in Fig. 11 and, during its movement, it will lower the presser-foot into contact with the heel. As shown in Fig. 3, the rod 146 has two parts, between which is interposed the compensating spring 292; and consequently, the lever 148 is permitted to continue its movement even after the presser-foot has been seated against the heel. During this continued movement of the lever 148 it strikes against the lower end of the tripper rod 290 and elevates the latter in opposition to a depressing spring mounted in a socket 294 on the machine frame (Fig. 3ª). The tripper rod 290 has an integral cam tooth 296 which, during the upward movement of the rod, engages a corresponding cam tooth 298 mounted in a socket on the clutch controlling dog 286. Through the engagement of the teeth 296 and 298, the ascending tripper rod 290 rocks the dog 286 clockwise in Figs. 3 and 3ª and thereby permits engagement of the clutch, which at once ensues. The dog 286 is rocked thus until it abuts against the lower surface of the stationary socket 294, whereupon it is positively arrested against further movement. The tripper rod 290 continues to ascend, however, with the result that the cam tooth 296 on the rod forces the cam tooth 298 on the dog toward the right in opposition to its spring 300. Before the operator has depressed his treadle to the limit of its movement the tooth 296 on the tripper rod will pass completely beyond the tooth 298 on the dog, whereupon the dog will return to its normal unclutching position by gravity. At the end of a single revolution of the shaft the inclined end of the dog 286 will cam off the ear 284 and disengage the clutch. Thus the clutch will be disengaged at the proper time whether or not the operator releases his treadle. When the treadle is released the tripper rod 290 will be forced downwardly by its depressing spring (in the socket 294) and its tooth 296 will simply pass by the tooth 298, displacing the latter temporarily and then permitting it to move forward again into its operative position shown in Fig. 3ª.

The specific embodiment of the invention shown in the drawings has been sufficiently described to disclose the general character of the invention. It is to be understood, however, that this disclosure is not intended to define the scope of the invention but is merely illustrative of some of the uses to which the invention may be applied. In conclusion it is expedient to review the complete series of operations attendant upon the use of the specific machine in breasting a shoe. The operator places a shoe upon the work support A when the latter occupies the position shown in Fig. 1, and then rocks the work support toward the left until the heel of the shoe stands beneath the presser-foot B. He then depresses the treadle corresponding to the right or left shoe on the work support and thereby seats the presser-foot B against the heel of the shoe; and at the same time, moves the appropriate side gage D into its operative position. It has been explained heretofore that the front edge of the presser-foot B may indicate substantially accurately the shape which will be given to the heel breast by the breasting knife. Accordingly, the operator uses the presser-foot edge as a gage by which to adjust the breast of the heel. Ordinarily he will place the outside breast corner exactly in register with the presser-foot edge and will there hold it as he swings the shoe into contact with the operatively positioned side gage D. When these adjustments of the shoe have been effected, all is in readiness for the power operation of the machine.

The movement of the treadle which seats the presser-foot against the heel and introduces a side gage D consumes only the initial part of the throw of the treadle; and, if necessary, the operator may then hold the treadle only partially depressed while he effects the adjustments of the shoe. In practice, however, the adjustment of the shoe by a skilled operator may be accomplished almost instantaneously so that he may move the treadle through its entire throw by a substantially continuous depression. During the latter part of the treadle depression the tripper rod 290 is elevated to rock the dog 286 and start the machine.

The various operating cams are mounted on the power shaft of the machine, which makes one complete rotation for each breasting operation. The first cam to act is the presser-foot path cam 164 (Fig. 11) which elevates the presser-foot cam rod 152. The ascent of the cam rod 152, through the agency of its attached cam block 180 (Fig. 3) actuates the work support locking devices shown in Figs. 13 and 14 and thereby locks the work support A securely in position. Continued ascent of the presser-foot cam rod 152 forces the presser foot firmly against the heel of the then adjusted shoe, and clamps it securely in adjusted position. The second cam to act is the breasting stop cam (Fig. 3) which rocks the lever 228; elevates the breasting stop rod 226 (Fig. 2) and its rack 222; rotates the shaft 218; and, through the racks 217 on the breasting stop slide 214, moves the breasting stop downwardly into yielding engagement with the shank of the shoe. In whatever position the shoe may be adjusted, it is held securely in that position before the breasting stop engages it; and therefore the breasting stop is enabled definitely to predetermine in relation to the shoe, the extent of throw which shall be permitted to the breasting knife. In other words, the breasting stop measures the extent of effective operation of the knife by reference to the adjusted position of the shoe.

The knife carrier 186 is depressed by an eccentric and, consequently, the movement of the knife begins as soon as the power operation of the machine is started but at first this movement is negligible in that it allows the shoe clamping operations and the descent of the breasting stop to take place before the knife begins to cut. Continued descent of the knife, however, cuts by a single stroke completely through the heel and is arrested only when the bunter 250 (rigid with the knife carrier 186) strikes against the breasting stop 212. During the descent of the knife the breasting stop slides 214 are rigidly clamped to the frame of the machine and before the bunter 250 strikes the breasting stop 212 the latter becomes in effect a part of the machine frame and performs its knife arresting office entirely independently of the shoe, although its position to this end is determined by the location of the shoe.

It has been stated that the breasting stop 212 is trunnioned on the breasting stop slide 214. This permits the lower face of the breasting stop to accommodate itself to the inclination of the shoe shank by rocking the stop on its trunnions. The upper surface of the stop is substantially semi-cylindrical, having its axis coinciding with that of the trunnions; and, consequently, however the stop may be inclined in seating itself upon the shoe shank, its upper surface maintains a constant relation to the breasting stop slide 214. Thus the bunter, which strikes against the cylindrical top surface of the stop, will always be arrested in a position determined by the vertical adjustment of the trunnions of the breasting stop, the result being that mere varying inclinations of shoe shanks are of no effect materially to influence the knife arresting action of the stop.

When the breasting operation has been completed and the knife begins its return ascent, the chip removing mechanism shown in Figs. 19 to 21 lifts the chip away from the shoe and permits the operator to inspect the shaped heel breast. Thereafter, the chip is released and dropped back onto the shoe shank while the various parts of the machine return to their normal positions of rest.

At any time after the machine has started the operator may release his treadle and it is immaterial if he holds the treadle down throughout the operation of the machine and thereafter, since the machine will be stopped at the completion of a single breasting operation regardless of the position of the treadle.

When the shoe has been properly breasted the operator rocks the work support on its pivot to the position shown in Fig. 1. During this movement of the shoe the chip discarding mechanism moves its brush across the shank of the shoe in front of the heel breast and throws the chip off at one side. The operator removes the breasted shoe, introduces another to the work support, and repeats the operations described.

The preceding description is sufficient to explain one practicable embodiment of the invention employing various features of the invention coöperatively. No attempt has been made to suggest the various organizations and modes of operation to which the invention and its several features may be applied, either individually or otherwise, since the adaptability of the invention will be readily apparent to those skilled in the art, and the proper scope of the said features is indicated in the subjoined claims, which, of course, are not to be limited essentially to the specific exemplary embodiment disclosed.

Claims—

1. In a heel breasting machine, the combination of breasting means; a breasting stop; means relatively to move the stop and work into contact; and means to support the stop independently of the work, while the stop arrests the operation of the breasting means.

2. In a heel breasting machine, the combination of breasting means; a pivotally mounted breasting stop to contact with the work; and means to support the stop independently of the work while the stop arrests the operation of the breasting means.

3. In a heel breasting machine, the combination of breasting means; and means to arrest the operation thereof, including an automatically-adjustable power-operated stop, and means to support the stop independently of the shoe while performing its arresting office.

4. In a heel breasting machine, the combination of breasting means; and means to arrest the operation thereof, including a stop automatically relatively adjustable to contact with the work and to conform to varying inclinations of the work, and means to support the stop independently of the shoe while performing its arresting office.

5. In a heel breasting machine, the combination of breasting means; a breasting stop; means other than said breasting means to move the stop to and from operative position; and means to support the stop independently of the shoe, to arrest the operation of the breasting means.

6. In a heel breasting machine, the combination of a breasting device; a breasting stop; means to move the stop to and from an operative position controlled by the shoe; and means to support the stop independently of the shoe to arrest the breasting operation.

7. In a heel breasting machine, the combination of breasting means; a breasting stop; means to move the stop to and from operative position; and means to support the stop independently of the shoe and breasting means, to arrest the operation of the latter.

8. In a heel breasting machine, the combination of a breasting tool; means for causing the tool to shape a heel breast; and means for arresting the operation of the breasting tool, including an adjustable breasting stop, means to adjust it and means to hold it stationary independent of the shoe preparatory to its arresting operation.

9. In a heel breasting machine, the combination of a breasting tool; means for causing the tool to shape a heel breast; a stop adjustable by reference to the shoe to arrest the operation of the tool; means to adjust the stop; and means independent of the shoe for supporting the stop during the performance of its arresting office.

10. In a heel breasting machine, the combination of a work support; a breasting knife; means to move them relatively toward each other; a breasting stop relatively adjustable to contact with the work preparatory to the effective operation of the breasting knife; means relatively to adjust the stop and work; means for supporting the breasting stop, in adjusted relation, independently of the work; and means controlled by the relative adjustment of the stop and work for arresting the operation of the knife.

11. In a heel breasting machine, the combination of a shoe support; a knife; a bunter movable with the knife; a stop for the bunter; automatic means to adjust the stop; and means to support the stop independently of the shoe.

12. In a heel breasting machine, the combination of breasting means; a breasting stop to predetermine the extent of operation of said means to suit a given heel; automatic means relatively to adjust said stop and a heel; and means independent of the shoe to sustain the acting pressure of said stop.

13. In a heel breasting machine, the combination of a breasting tool; a work support; and a pivotally mounted breasting stop to act intermediately the tool and the work to arrest the operation of the former, and means other than the work for supporting the stop during the performance of its arresting office.

14. In a heel breasting machine, the combination of a breasting tool; a work support; and a work contacting breasting stop automatically adjustable to conform to varying shapes of shank.

15. In a heel breasting machine, the combination with breasting means; of a breasting stop movable independently of the knife; and power operated means for independently moving the stop.

16. In a heel breasting machine, the combination of breasting means; a breasting stop to arrest the operation thereof; power operated means for independently moving the stop to and from operative position; and a spring interposed between said power means and the stop.

17. In a machine for operating upon the bottoms of boots and shoes, the combination with working devices, of means for positioning a shoe relative to said working devices comprising normally inoperative forepart gages, and treadle actuated mechanism for selectively moving one or the other of said gages into operative, side gaging position to determine the right or left swing to be given a shoe with respect to the working devices.

18. In a machine for operating upon boots and shoes; a work-contacting device to determine a right or left relative angular adjustment of a shoe; and means controlled by the operator to move the gaging device upwardly and laterally away from the shoe to permit free manipulation of the latter.

19. In a machine for operating upon the bottoms of boots and shoes, the combination of a tool; a work support; independently-operable side-gages to contact alternatively with a shoe to determine the relative lateral alinement of the shoe and tool, and treadle operated means for moving said gages.

20. In a machine for operating upon the bottoms of boots and shoes, the combination of working means; a shoe support; normally inoperative side gages; means for adjusting said gages reciprocally in unison and treadle operated means for selectively moving one or the other of said gages into gaging position.

21. In a machine for operating upon the bottoms of boots and shoes, the combination of working means; a shoe support; side gages, adjustable lengthwise of the shoe, and treadle operated means for selectively moving one or the other of said gages into operative position, to determine relative right and left adjustments of the shoe and working means.

22. In a machine for operating upon the bottoms of boots and shoe, the combination of working means; a side gage; an inclined pivot upon which said gage is mounted; and means to move the gage in a plane oblique to the shoe.

23. In a machine for operating upon the bottoms of boots and shoes, the combination, with working means, of means including oppositely disposed side gages for determining the right or left swing of a shoe relative to said working means, and independently operable controlling devices for causing the movement of said positioning gages to operative position.

24. In a machine for operating upon the bottoms of boots and shoes, the combination, with working means, of a shoe support, a pair of side gages located at opposite sides of said shoe support and comprising gage arms mounted to swing toward and from said shoe support, and independently operable controlling devices for causing movement of each of said gage arms.

25. In a machine for operating upon the bottoms of boots and shoes, the combination with working means, of a shoe support, a plurality of side gages independently movable toward and from said shoe support and adjustable longitudinally of said shoe support, and independent treadle operated means for moving one or the other of said side gages into operative position.

26. In a machine for operating upon the bottoms of boots and shoes, the combination, with working means, of a shoe support, a gage arm mounted for swinging movement toward and from said support, and a side gage carried by said arm and adjustable longitudinally thereof.

27. In a machine for operating upon the bottoms of boots and shoes, the combination, with working means, of a shoe support, a fulcrum block laterally adjustable toward and from said support, a gage arm fulcrumed in said block for swinging movement toward and from said support, and treadle operative means for swinging said gage arm.

28. In a machine for operating upon the bottoms of boots and shoes, the combination, with working means, of a shoe support, a plurality of side gages independently movable toward and from said support and adjustable longitudinally thereof to determine the right and left swing of a shoe on said support, and means whereby the limits of movement of said gages may be adjusted.

29. In a machine for operating upon boots and shoes, the combination of working means; means to determine relative right and left adjustments of shoes and the working means; laterally expansible means to clamp the heel portion of a shoe from within for presenting it to said adjusting means; and means external to the shoe to coöperate with said expansible means to hold the shoe in adjusted position.

30. In a machine for operating upon the heels of boots and shoes, the combination of working means and a work support relatively movable to and from operative relation; a laterally expansible jack on the work support; and means whereby the jack is expanded upon relative movement of the working means and work support to clamp the shoe in lateral position.

31. In a machine for operating upon the bottoms of boots and shoes, the combination of side gages; a presser-foot; a work support; a tool; and means controlled by the operator, arranged by a single movement to introduce a side gage, to seat the presser-foot on the shoe, and to start the power operation of the machine.

32. In a heel breasting machine, the combination of breasting means; tread angle adjusting means; median angle adjusting means; treadle means to effect preliminary adjustment by the median angle adjusting means; and power means, started by said treadle means, to clamp the work in adjusted position.

33. In a machine for shaping heels of boots and shoes, the combination of chip-severing means; and means movable with said severing means after its operation for tearing away an incompletely severed chip in the event of partial failure of the severing means to completely perform its work.

34. In a heel breasting machine, the combination of a presser-foot; breasting means; and means, constructed and arranged to be operable by movement of one of said parts, to move a chip cut by said breasting means from in front of the shaped breast.

35. In a heel breasting machine, the combination of breasting means; means to remove a chip cut thereby; and means to operate the same through movement of said breasting means.

36. In a heel breasting machine, the combination of breasting means; a breasting stop; and means to remove a chip cut by said breasting means, said last named means being constructed and arranged to be operable by movement of said breasting stop.

37. In a heel breasting machine, the combination of breasting means; a chip-engager to lift a chip from in front of the shaped breast; means for causing the chip-engager to release the chip and means to operate the same through movement of the breasting means.

38. In a heel breasting machine, the combination of breasting means; means to move a chip temporarily from in front of a shaped breast; and brushing means to completely discard the chips left in front of the heel breast.

39. In a heel breasting machine, the combination of breasting means; and brushing means to remove the chips from the sole of the shoe, said brushing means being constructed and arranged to operate on the outward movement of the shoe.

40. In a machine for shaping parts of boots and shoes, the combination of chip-severing means and a work support relatively movable to and from operative relation; and means to brush the work when the work support and severing means depart from operative relation.

41. In a heel breasting machine, the combination of breasting means; chip discarding means movable over the shoe sole in front of the heel to remove a chip severed by the breasting means; and means to move the chip discarding means transversely of the shoe.

42. In a heel breasting machine, the combination of breasting means; a work support movable to and from operative position; and means actuated by movement of the work support to discard a chip from the work.

43. In a heel breasting machine, the combination of a knife having a beveled edge; a movable carrier for the knife having means movable on the machine frame to support the knife laterally proximate its cutting edge on the side opposite the bevel; and provision for presenting the work to the knife.

44. In a heel breasting machine, the combination of a knife; a carrier therefor having a knife support movable relative to the knife and proximate the cutting edge of the knife; and provision for presenting the work to the knife.

In testimony whereof, I have signed my name to this specification, in the presence of two subscribing witnesses.

THOMAS G. PLANT.

Witnesses:
JOSIAH MINOR FOWLER,
LAURENCE A. JANNEY.